United States Patent
Wu et al.

(10) Patent No.: US 12,067,277 B2
(45) Date of Patent: Aug. 20, 2024

(54) USE OF COPY LOCATION TO SELECTIVELY SET OR SELECTIVELY CLEAR BITS OF METADATA DURING LIVE MIGRATION

(71) Applicant: Samsung Electronics Co., Ltd., Suwon-si (KR)

(72) Inventors: Chun-Chu Chen-Jhy Archie Wu, San Carlos, CA (US); Fnu Vikram Singh, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/170,717

(22) Filed: Feb. 17, 2023

(65) Prior Publication Data

US 2023/0205444 A1    Jun. 29, 2023

Related U.S. Application Data

(63) Continuation of application No. 17/450,409, filed on Oct. 8, 2021, now Pat. No. 11,586,372.

(60) Provisional application No. 63/217,714, filed on Jul. 1, 2021.

(51) Int. Cl.
*G06F 3/06* (2006.01)

(52) U.S. Cl.
CPC ............ *G06F 3/0647* (2013.01); *G06F 3/061* (2013.01); *G06F 3/0653* (2013.01); *G06F 3/0683* (2013.01)

(58) Field of Classification Search
CPC ......... G06F 3/0646–0675; G06F 3/061; G06F 3/0653; G06F 3/0683
See application file for complete search history.

(56) References Cited

U.S. PATENT DOCUMENTS

| | | | |
|---|---|---|---|
| 6,430,628 B1 * | 8/2002 | Connor | G06F 13/28 710/5 |
| 7,039,746 B2 | 5/2006 | Takahashi et al. | |
| 9,753,645 B1 | 9/2017 | McBride et al. | |
| 10,275,361 B2 | 4/2019 | Ish et al. | |
| 10,719,463 B1 | 7/2020 | Bshara et al. | |
| 2005/0071595 A1 | 3/2005 | Irish et al. | |

(Continued)

FOREIGN PATENT DOCUMENTS

| WO | 2018/176359 A1 | 10/2018 |
|---|---|---|
| WO | 2021/017719 A1 | 2/2021 |

OTHER PUBLICATIONS

EPO Extended European Search Report dated Nov. 18, 2022, issued in corresponding European Patent Application No. 22181464.3 (7 pages).

*Primary Examiner* — Chie Yew
(74) *Attorney, Agent, or Firm* — Lewis Roca Rothgerber Christie LLP

(57) ABSTRACT

A method for tracking a progress of data copying for a live migration includes transferring, by a storage controller, a first data structure to a live migration server, the first data structure including a first status identifier indicating a location of a source data to be copied from a source storage to a target storage, and selectively generating or selectively clearing, by the storage controller, a second status identifier in or from a second data structure, based on a first current copying location of the live migration server, the second status identifier indicating a location of a first user data write to the source storage.

20 Claims, 14 Drawing Sheets

(56) References Cited

U.S. PATENT DOCUMENTS

| | | |
|---|---|---|
| 2007/0079051 A1 | 4/2007 | Tanaka et al. |
| 2012/0023273 A1 | 1/2012 | Myouga |
| 2015/0234617 A1 | 8/2015 | Li et al. |
| 2020/0356493 A1 | 11/2020 | Mukherjee et al. |
| 2021/0026551 A1 | 1/2021 | Tidke et al. |
| 2021/0224210 A1 | 7/2021 | Ouyang et al. |

* cited by examiner

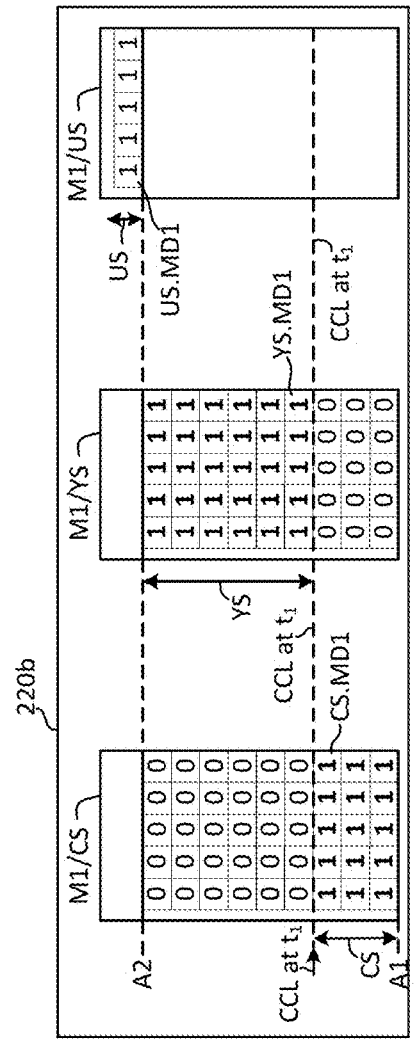
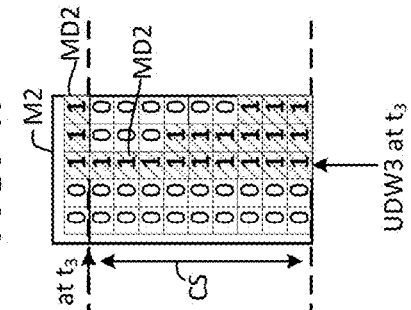
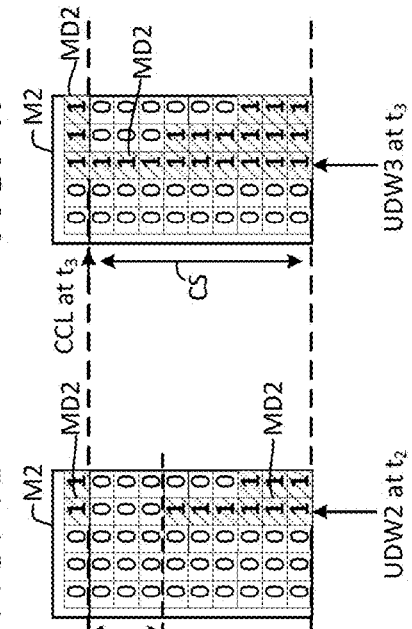
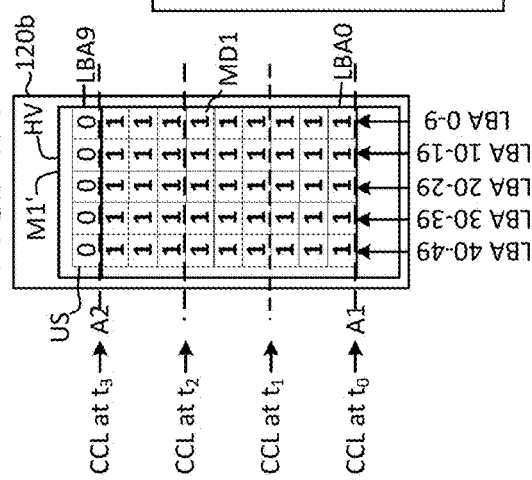
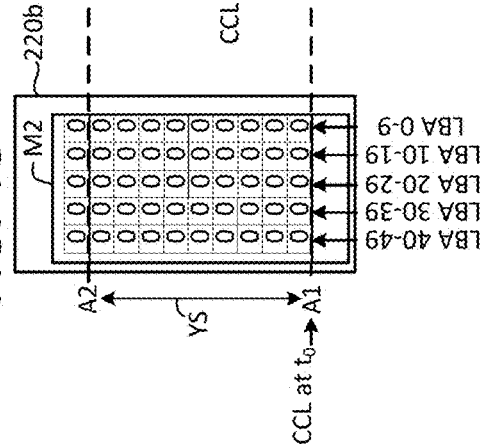

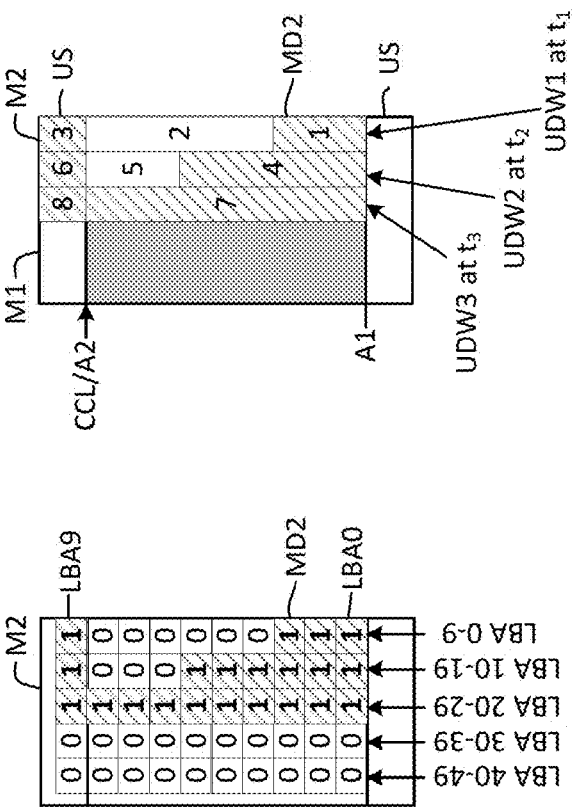
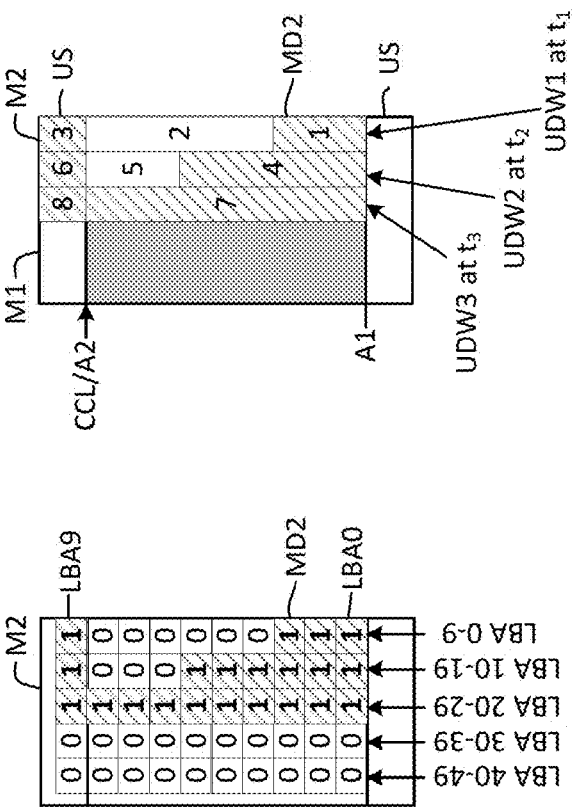

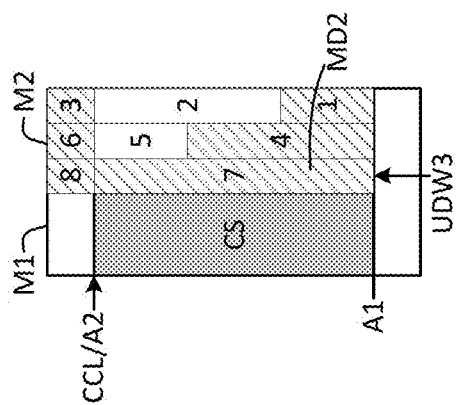
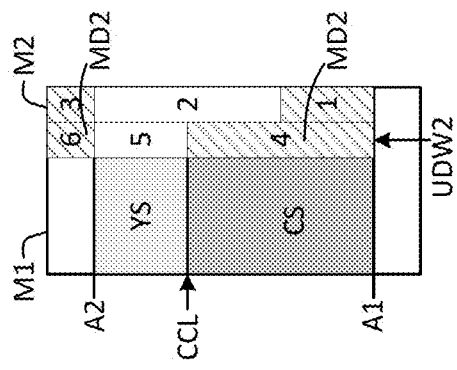
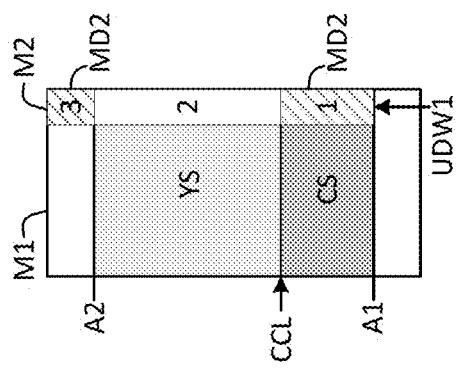
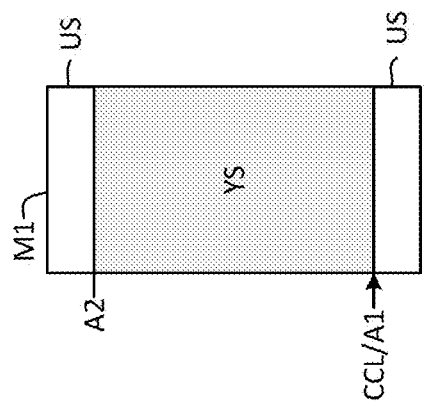

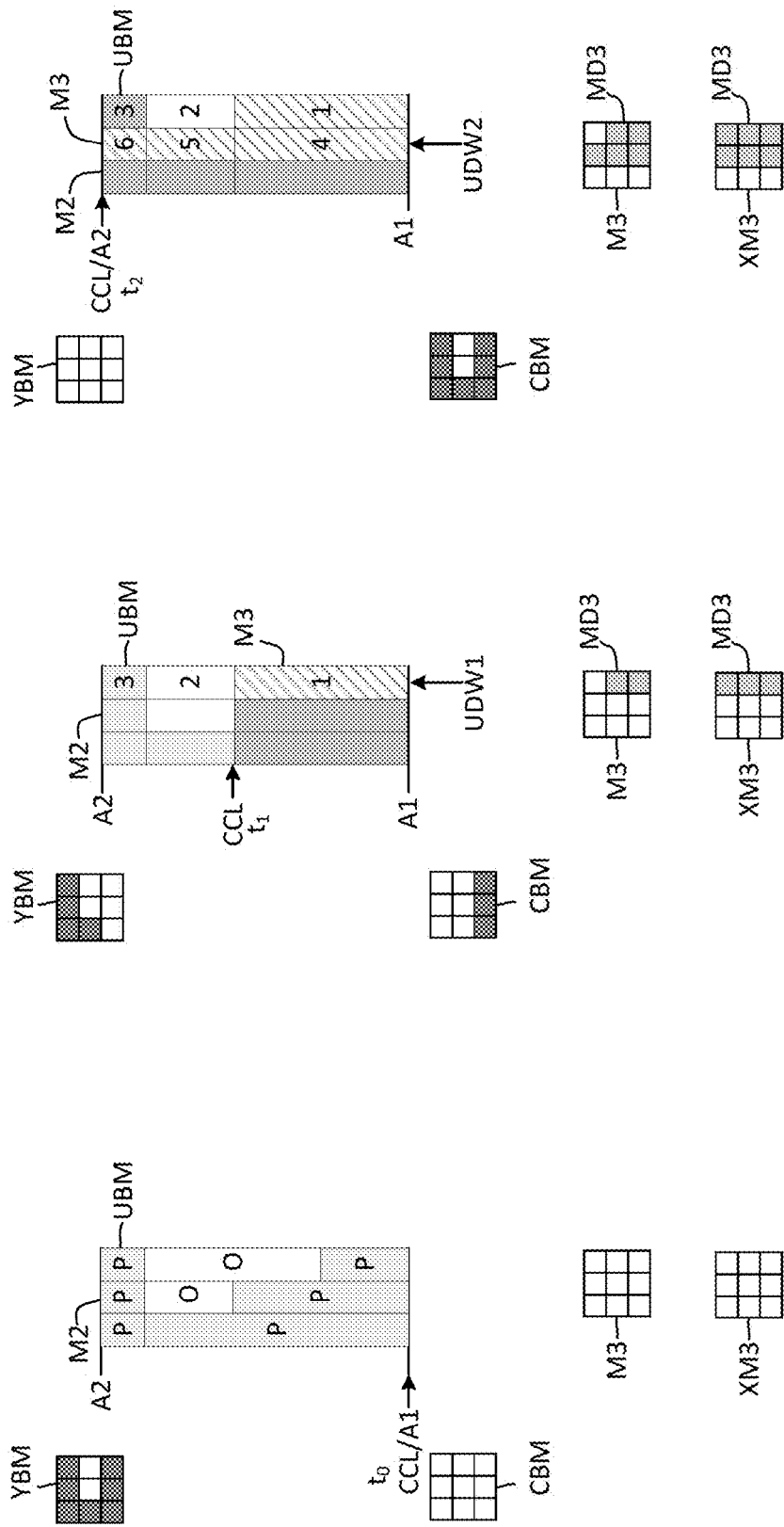

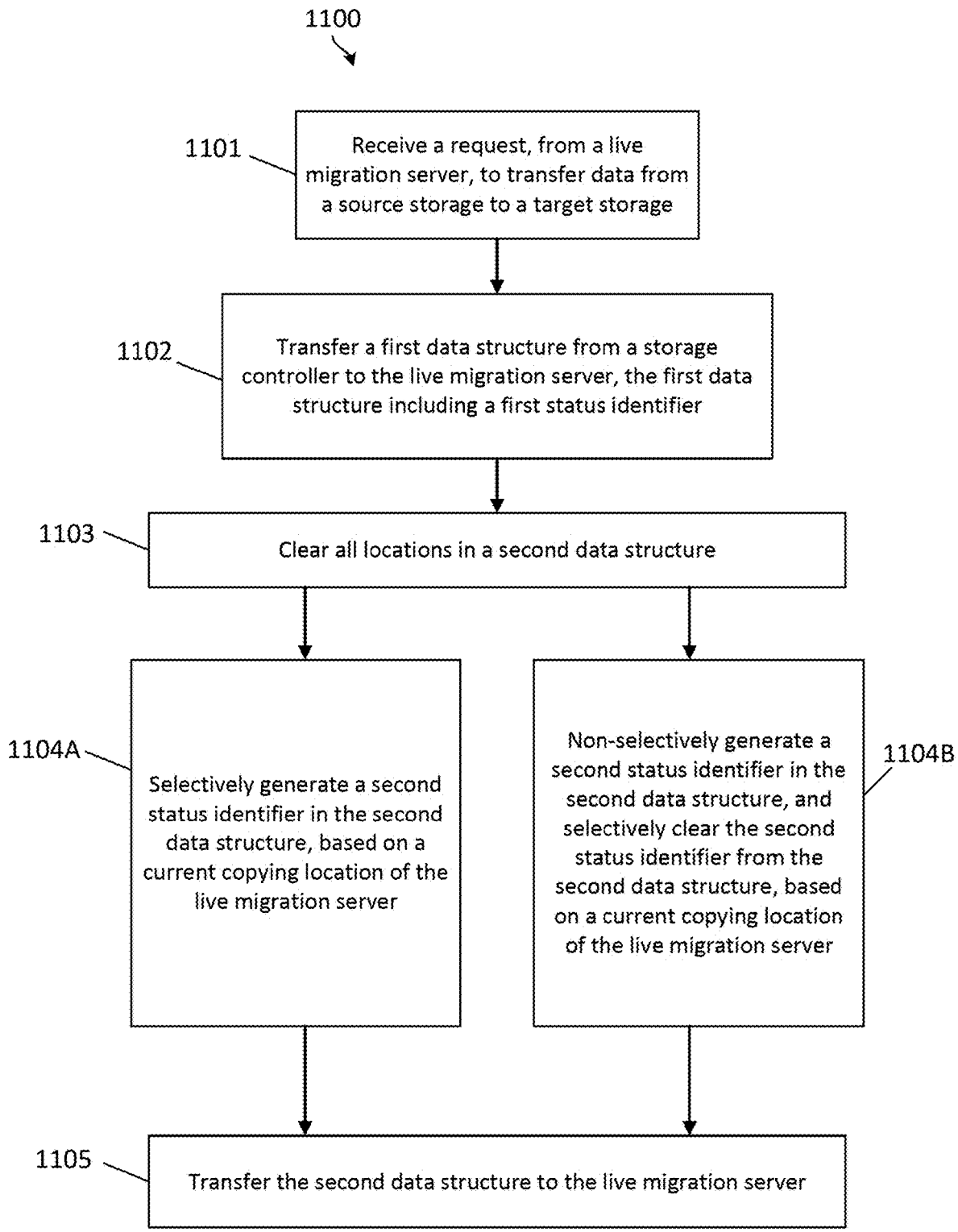

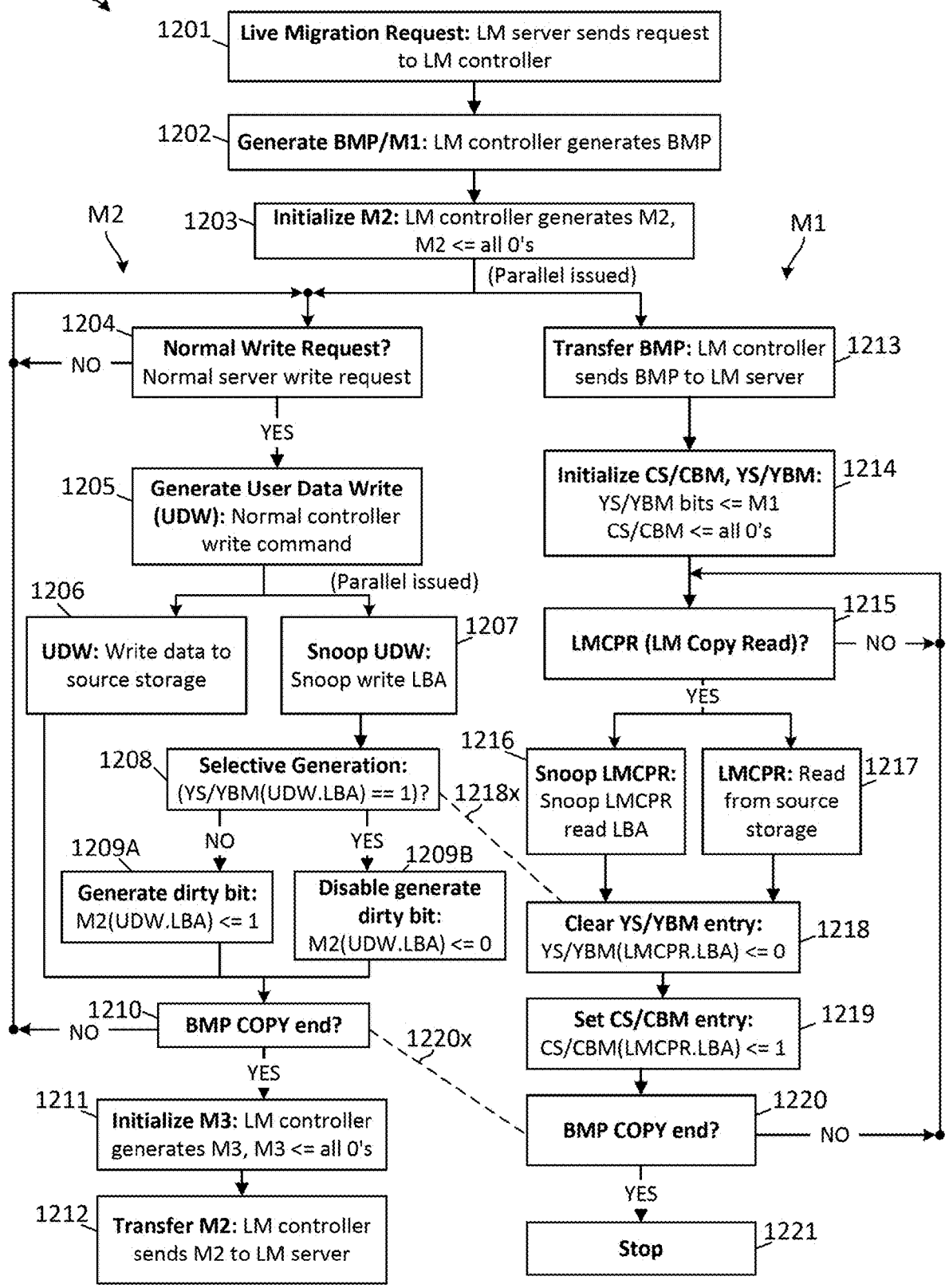

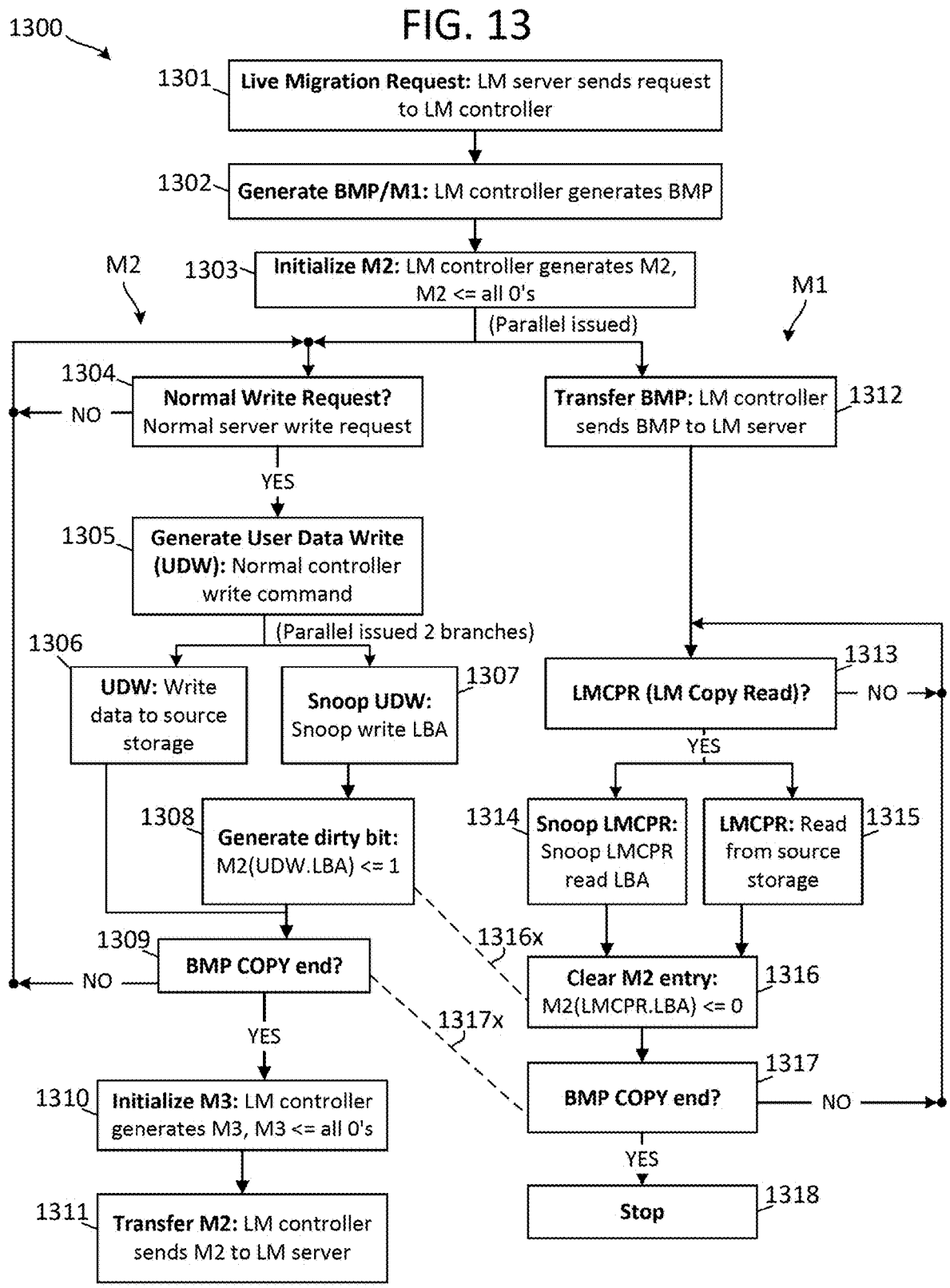

USE OF COPY LOCATION TO SELECTIVELY SET OR SELECTIVELY CLEAR BITS OF METADATA DURING LIVE MIGRATION

CROSS-REFERENCE TO RELATED APPLICATION(S)

The present application is a continuation of U.S. patent application Ser. No. 17/450,409, filed on Oct. 8, 2021, now U.S. Pat. No. 11,586,372, which claims priority to, and the benefit of, U.S. Provisional Application Ser. No. 63/217,714, filed Jul. 1, 2021, entitled "ACTIVE ENTRIES REDUCTION ALGORITHM IN THE DIRTY BITMAP FOR LIVE MIGRATION," the entire contents of which are incorporated herein by reference.

FIELD

One or more aspects of embodiments according to the present disclosure relate to computer storage, and more particularly to methods, devices, and systems for tracking a progress of data copying for live migration operations.

BACKGROUND

The present background section is intended to provide context only, and the disclosure of any embodiment or concept in this section does not constitute an admission that said embodiment or concept is prior art.

In the field of computer storage, a live migration (LM) operation (or live migration process) may refer to a copying of data from a source storage to a target storage at a time when the source storage may potentially receive a user data write from a source server (e.g., a normal source server, or a normal source host, that is not a live migration server, or a live migration host). Data structures (e.g., bitmaps) may be used to identify initial data locations within the source storage to be copied to the target storage. A live migration server may use (e.g., refer to) the data structures to perform the live migration process, which may include copying relevant data (e.g., mapped data in an initial state) from the source storage and writing the relevant data to the target storage. Because the copying and writing processes may take a significant amount of time, data structures (e.g., bitmaps) may also be used to track locations of subsequent user data writes that occur at relevant locations of the source storage, after a transferring of the initial data structures to the live migration server. Tracking the locations of the subsequent user data writes may allow the migration server to update the relevant data at the target storage, based on the locations of the user data writes at the source storage. However, such data structures used to track the subsequent data writes (e.g., "dirty bitmaps") may include metadata (e.g., one or more "dirty" bits, or status identifiers) identifying locations of the relevant source data that were not yet copied by the live migration server when the data writes were recorded in the dirty bitmap. Thus, redundant copying may occur when the live migration server performs an initial copying of data from the source storage to the target storage using the initial data structure (e.g., an initial dirty bitmap) and when the live migration server performs later copying using a tracked data structure (e.g., a second or later dirty bitmap), which slows down the live migration process.

Accordingly, there is a need for methods, devices, and systems for efficiently managing the use of bitmaps for updating data associated with a live migration process.

SUMMARY

Aspects of embodiments of the present disclosure relate to computer storage systems, and provide improvements to the management and tracking of metadata for identifying locations in a source storage having data updates to be copied to a target storage.

According to some embodiments of the present disclosure, there is provided a method for tracking a progress of data copying for a live migration, the method including transferring, by a storage controller, a first data structure to a live migration server, the first data structure including a first status identifier indicating a location of a source data to be copied from a source storage to a target storage, and selectively generating or selectively clearing, by the storage controller, a second status identifier in or from a second data structure, based on a first current copying location of the live migration server, the second status identifier indicating a location of a first user data write to the source storage.

The method may further include monitoring, by the storage controller, the first current copying location, the first current copying location corresponding to a copying of the source data based on the first data structure, and monitoring, by the storage controller, the first user data write, wherein the selectively generating the second status identifier in the second data structure may include tracking, by the storage controller, a planned but yet to be copied section of the source storage and a planned and copied section of the source storage, based on the first current copying location, and determining whether to generate the second status identifier in the second data structure based on the planned but yet to be copied section.

The tracking the planned but yet to be copied section and the planned and copied section may include tracking a current copy index corresponding to a start address of a continuous index and to an end address of the continuous index, the continuous index being associated with a planned to copy section, the planned to copy section including contiguous storage locations.

The tracking the planned but yet to be copied section and the planned and copied section may include tracking a planned but yet to be copied bitmap and a planned and copied bitmap, the planned but yet to be copied bitmap and the planned and copied bitmap being associated with a planned to copy section, the planned to copy section including one or more distributed storage locations.

The tracking the planned but yet to be copied section and the planned and copied section may include tracking a planned but yet to be copied bitmap associated with a planned to copy section, the planned to copy section including one or more distributed storage locations, and tracking, using the planned but yet to be copied bitmap, the planned and copied section by inverting a bit state used to track the planned but yet to be copied section.

The selectively clearing the second status identifier from the second data structure may include generating the second status identifier in the second data structure based on the first user data write, and clearing, by the storage controller, the second status identifier from the second data structure, based on the second status identifier being associated with the first current copying location of the live migration server.

The method may further include monitoring, by the storage controller, the first current copying location, the first current copying location corresponding to a copying of the source data based on the first data structure, monitoring, by the storage controller, the first user data write, transferring the second data structure to the live migration server, monitoring, by the storage controller, a second current copying location of the live migration server, the second current copying location corresponding to a copying of the source data based on the second data structure, monitoring, by the storage controller, a second user data write to the source storage, the second user data write occurring during or after the transferring of the second data structure, and selectively generating or selectively clearing, by the storage controller, a third status identifier in or from a third data structure, based on the second current copying location of the live migration server, the third status identifier indicating a location of the second user data write.

According to other embodiments of the present disclosure, there is provided a storage device for tracking a progress of data copying for a live migration, the storage device being configured to transfer a first data structure from a storage controller to a live migration server, the first data structure including a first status identifier indicating a location of a source data to be copied from a source storage to a target storage, and selectively generate or selectively clear, by the storage controller, a second status identifier in or from a second data structure, based on a first current copying location of the live migration server, the second status identifier indicating a location of a first user data write to the source storage.

The storage device may be configured to monitor the first current copying location, the first current copying location corresponding to a copying of the source data based on the first data structure, and monitor the first user data write, wherein the selectively generating the second status identifier in the second data structure includes tracking a planned but yet to be copied section of the source storage and a planned and copied section of the source storage, based on the first current copying location, and determining whether to generate the second status identifier in the second data structure based on the planned but yet to be copied section.

The tracking the planned but yet to be copied section and the planned and copied section may include tracking a current copy index corresponding to a start address of a continuous index and to an end address of the continuous index, the continuous index being associated with a planned to copy section, the planned to copy section including contiguous storage locations.

The tracking the planned but yet to be copied section and the planned and copied section may include tracking a planned but yet to be copied bitmap and a planned and copied bitmap, the planned but yet to be copied bitmap and the planned and copied bitmap being associated with a planned to copy section, the planned to copy section including one or more distributed storage locations.

The tracking the planned but yet to be copied section and the planned and copied section may include tracking a planned but yet to be copied bitmap associated with a planned to copy section, the planned to copy section including one or more distributed storage locations, and tracking, using the planned but yet to be copied bitmap, the planned and copied section by inverting a bit state used to track the planned but yet to be copied section.

The storage device may be configured to monitor the first current copying location, the first current copying location corresponding to a copying of the source data based on the first data structure, and monitor the first user data write, wherein the selectively clearing the second status identifier from the second data structure includes generating the second status identifier in the second data structure based on the first user data write, and clearing the second status identifier from the second data structure, based on the second status identifier being associated with the first current copying location of the live migration server.

The storage device may be configured to transfer the second data structure to the live migration server, monitor a second current copying location of the live migration server, the second current copying location corresponding to a copying of the source data based on the second data structure, monitor a second user data write to the source storage, the second user data write occurring during or after the transferring of the second data structure, and selectively generate or selectively clear a third status identifier in or from a third data structure, based on the second current copying location of the live migration server, the third status identifier indicating a location of the second user data write.

According to other embodiments of the present disclosure, there is provided a system for tracking a progress of data copying for a live migration, the system including a live migration server, and a storage device, wherein the storage device is configured to transfer a first data structure from a storage controller to the live migration server, the first data structure including a first status identifier indicating a location of a source data to be copied from a source storage to a target storage, and selectively generate or selectively clear, by the storage controller, a second status identifier in or from a second data structure, based on a first current copying location of the live migration server, the second status identifier indicating a location of a first user data write to the source storage.

The storage device may be configured to monitor the first current copying location, the first current copying location corresponding to a copying of the source data based on the first data structure, and monitor the first user data write, wherein the selectively generating the second status identifier in the second data structure includes tracking a planned but yet to be copied section of the source storage and a planned and copied section of the source storage, based on the first current copying location, and determining whether to generate the second status identifier in the second data structure based on the planned but yet to be copied section.

The tracking the planned but yet to be copied section and the planned and copied section may include tracking a current copy index corresponding to a start address of a continuous index and to an end address of the continuous index, the continuous index being associated with a planned to copy section, the planned to copy section including contiguous storage locations.

The tracking the planned but yet to be copied section and the planned and copied section may include tracking a planned but yet to be copied bitmap and a planned and copied bitmap, the planned but yet to be copied bitmap and the planned and copied bitmap being associated with a planned to copy section, the planned to copy section including one or more distributed storage locations.

The tracking the planned but yet to be copied section and the planned and copied section may include tracking a planned but yet to be copied bitmap associated with a planned to copy section, the planned to copy section including one or more distributed storage locations, and tracking, using the planned but yet to be copied bitmap, the planned and copied section by inverting a bit state used to track the planned but yet to be copied section.

The storage device may be configured to monitor the first current copying location, the first current copying location corresponding to a copying of the source data based on the first data structure, and monitor the first user data write, wherein the selectively clearing the second status identifier from the second data structure includes generating the second status identifier in the second data structure based on the first user data write, and clearing, by the storage controller, the second status identifier from the second data structure, based on the second status identifier being associated with the first current copying location of the live migration server.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4A, FIG. 4B, FIG. 4C, FIG. 4D, FIG. 4E, FIG. 4F, FIG. 4G, and FIG. 4H (collectively, FIG. 4) are simplified conceptual diagrams depicting details of a bitmap vision diagram for depicting methods for tracking a progress of data copying for a live migration, according to some embodiments of the present disclosure;

FIG. 5A, FIG. 5B, FIG. 5C, and FIG. 5D (collectively, FIG. 5) are bitmap vision diagrams depicting a method for tracking a progress of data copying for a live migration using a continuous index associated with contiguous storage locations and a selective generation of second status identifiers in a second data structure, according to some embodiments of the present disclosure;

FIG. 8A, FIG. 8B, and FIG. 8C (collectively, FIG. 8) are bitmap vision diagrams depicting a method for tracking a progress of data copying for a live migration in a subsequent iteration of data copying using a planned but yet to be copied bitmap and a planned and copied bitmap, corresponding to the second data structure of FIG. 7, and a selective generation of third status identifiers in a third data structure, according to some embodiments of the present disclosure;

FIG. 11 is a simplified summary flowchart depicting example operations of methods for tracking a progress of data copying for a live migration process using aspects of methods described above, with reference to FIGS. 1-10, according to some embodiments of the present disclosure;

FIG. 12 is a flowchart depicting example operations of selective generation methods for tracking a progress of data copying for a live migration process, according to some embodiments of the present disclosure; and FIG. 13 is a flowchart depicting example operations of selective clearing methods for tracking a progress of data copying for a live migration process, according to some embodiments of the present disclosure.

Figure 1:
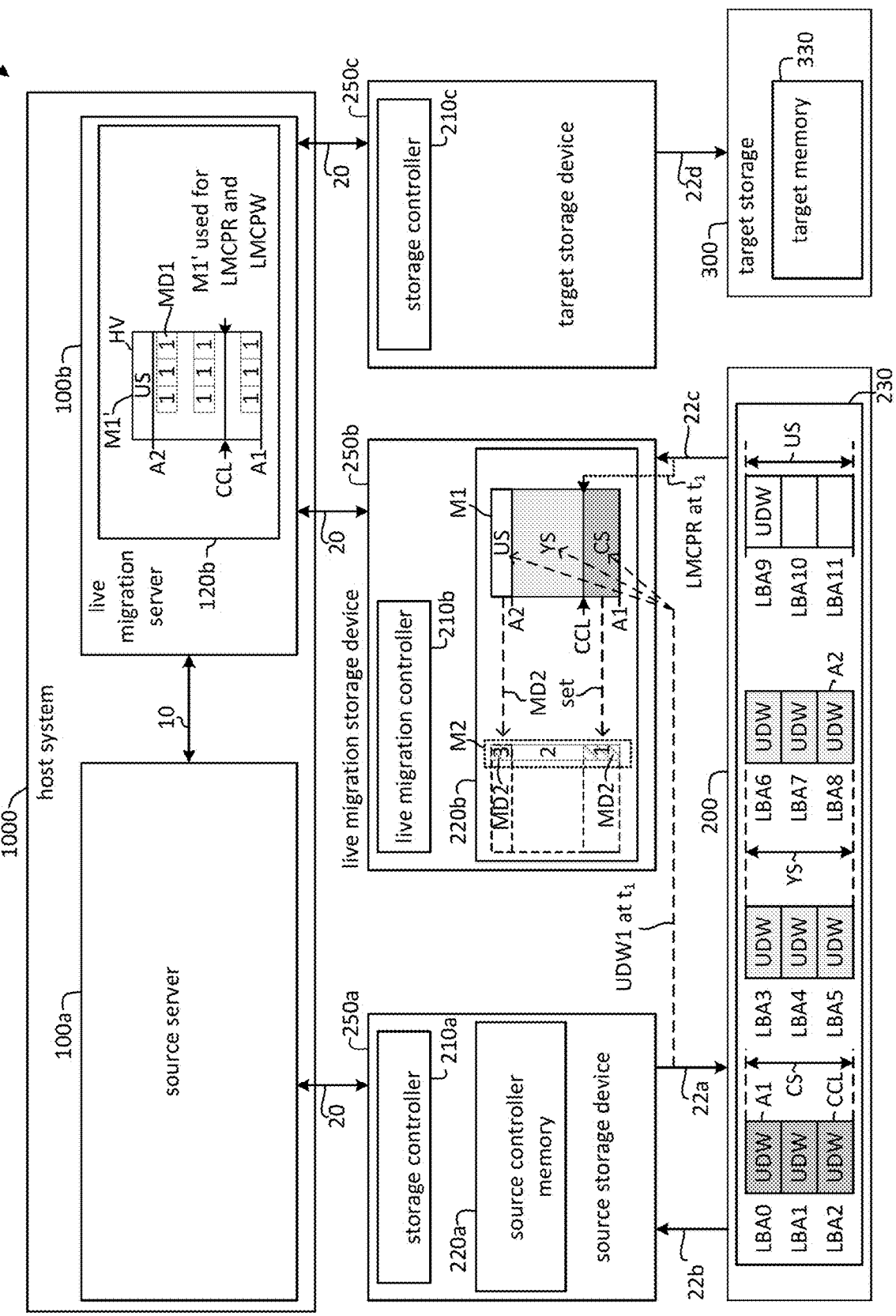
FIG. 1 is a system diagram depicting a system for tracking a progress of data copying for a live migration, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are example operations, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a live migration (LM) operation (or live migration process) may refer to a copying of data from a source storage to a target storage at a time when the source storage may potentially receive a user data write from a source server (e.g., normal source server or host). There may be three operations in a live migration. First, an initial copy may be made of all the in-use entries from a source to a destination. Second, "dirty" entries that are written during the initial copying of the in-use entries may be tracked and copied to the destination iteratively, to provide updates after the initial copying. Third, the copying may be stopped for a short period of time while the last list of the dirty entries may be copied to the destination and the data provided to the user may be changed over from a source drive to a destination drive. The present disclosure provides improvements for the tracking of dirty entries associated with the second operation.

Some tracking methods may track all written data from a user occurring during the initial copying of in-use entries as dirty entries, in a tracked record (e.g., a data structure), and the tracked record may be used by the live migration server performing the next iteration of copying after the initial copying is finished. For example, such methods may not stop tracking when a written address is in a source storage location that a live migration server is planning to copy but has yet to copy (e.g., some dirty entries may be located in a planned but yet to be copied section of the source storage). Tracking the user data writes to the planned but yet to be copied section in a dirty bitmap may create redundant copying and writing operations of a current copy operation and a next copy operation, thereby, slowing down the live migration process.

A mechanism for tracking a progress of data copying for a live migration according to aspects of embodiments of the present disclosure may: (1) reduce an amount of dirty entries in each iteration of tracking a progress of data copying in dirty bitmaps; (2) reduce a live migration time and power consumption (e.g., by reducing Copy Write operations that consume power); (3) reduce a latency associated with each iteration and an accumulated latency built up with each iteration of copying source data based on dirty bitmaps, by selectively generating or selectively clearing dirty bitmap entries based on a monitoring of a current copying location of a live migration server; and (4) reduce performance disturbance of user writes (e.g., normal user writes) and user reads (e.g., normal user reads) due to reducing the amounts of the copy read and copy write.

As used herein a "status identifier" (or "status identifier bit") is a type of metadata used to indicate whether a given storage location (e.g., a logical block address (LBA), byte address, etc.), of a source storage, includes data to be copied from the source storage to a target storage. For example, a status identifier set to "1" may indicate that a corresponding storage location includes data to be copied from the source storage to the target storage, whereas a status identifier bit set to "0" may indicate that a given storage location of the source storage, does not include data to be copied from the source storage to the target storage. Status identifiers may be arranged into a bitmap, where each status identifier in the bitmap corresponds to a different storage location (e.g., LBA, etc.). As used herein, a status identifier may indicate whether a corresponding storage location includes valid data (e.g., mapped data) or whether the corresponding storage location includes "dirty" data (e.g., changed data). However, the present disclosure is not limited to the above description. For example, in some embodiments, the roles of 1's and 0's may be reversed, or a different type of status identifier, besides 1's and 0's (e.g., a descriptive text), may be used to indicate whether or not a given storage location includes data to be copied from a source storage to a target storage. Furthermore, status identifiers may be arranged in other data structures, besides bitmaps.

As discussed in further detail below, with reference to FIGS. 1 to 13, a mechanism for tracking a progress of data copying for a live migration of data from a source storage (including one or more storage devices) to a target storage may allow for the use of fewer computing resources (e.g., memory space, data-bus bandwidth, power, and processing time) for tracking and transferring data associated with bitmaps (or other data structures) during the live migration process. The mechanism may involve tracking, by a storage controller (e.g., a live migration storage controller or live migration controller), user application data writes from a source storage controller (e.g., a normal source storage controller), and tracking a live migration copy read ("LMCPR") operation (e.g., process) status (e.g., a current copying location) of a live migration server (e.g., a host associated with managing the live migration process), as the live migration server copies data (e.g., data associated with a namespace for the live migration) from the source storage to the target storage. The live migration storage controller may (1) use the current copying location to track a planned and copied section and a planned but yet to be copied section of the relevant source storage data and (2) create bitmaps for providing information to the live migration server regarding a state of the relevant source storage data at different times throughout the live migration process.

The live migration controller may create a first bitmap to provide metadata (e.g., status identifiers) for a set of storage locations to the live migration server, indicating an initial state of the relevant source storage data to be copied to the target storage. The live migration storage controller may transfer the first bitmap to the live migration server to perform the live migration of the relevant data based on the first bitmap. The live migration storage controller may create a second bitmap (e.g., a bitmap of status identifiers that indicate whether corresponding storage locations are dirty), initially having all "0" entries (e.g., having all bits cleared to "0"), to track locations of user application (e.g., normal) data writes from a source storage controller to the source storage. The live migration controller may monitor (e.g., "snoop") the user application data writes from the source storage controller that occur while, or after, the first bitmap is transferred to the live migration server (e.g., during the live migration server's copying of metadata associated with the first bitmap and during the live migration server's copying of data from the source storage to the target storage, based on the first bitmap). Based on the monitored user data writes, the live migration controller may mark dirty (e.g., set 1's) to snoop address-associated bitmap entries in the second bitmap (e.g., the live migration controller may cause status identifier bits to be generated in the second bitmap). After the live migration server finishes copying data according to the first bitmap, the second bitmap may be transferred to the live migration server to update target storage data based on the user application data writes to the source storage.

The live migration storage controller may either selectively generate or selectively clear the status identifier bits (e.g., "dirty" bits for indicating locations of user application data writes) in the second bitmap, based on a current copying location of the live migration server, to reduce an amount of redundant storage data copying. For example, the live migration controller may follow two methodologies (e.g., two separate approaches to reducing dirty bit entries in dirty page bitmaps): (1) disable/prevent tracking (e.g., filter the tracking of or selectively track) locations of user application data writes to the planned but yet to be copied section of the source storage in the second bitmap or (2) track and set status identifier bits (e.g., dirty bits) based on the occurrence of a user data write UDW but, later, clear status identifier bits (e.g., dirty bits) in the second bitmap if they correspond to a current copying location of the live migration server. When tracking but, later, clearing dirty bits, the live migration controller need not reference a planned and copied section or a planned but yet to be copied section. Accordingly, as a result of either methodology (selectively generating or selectively clearing), the second bitmap may: (1) include a reduced amount of dirty entries in the data structures to be transferred to the live migration server and (2) prevent a needless duplicate copying of data, from the source storage, by the live migration server. This may reduce memory usage, reduce bandwidth usage, reduce power consumption, reduce processing time, and reduce disruption of user data writes UDW and user data reads UDR (e.g., in comparison to their normal performance).

In the case of tracking a current copying location of distributed source storage data (e.g., where two or more storage locations corresponding to source data to be copied from the source storage are not immediately adjacent to each other), the live migration controller may track the current copying location of the live migration server by using, for example, two separate bitmaps, (1) a planned and copied bitmap and (2) a planned but yet to be copied bitmap. (As discussed above, although the description refers to bitmaps, the present disclosure is not limited to bitmaps. It should be understood that other data structures may be used for tracking a progress of data copying for a live migration.) Alternatively, the live migration controller may track the current copying status of the live migration server using only a planned but yet to be copied bitmap (instead of also tracking in a planned and copied bitmap) and identifying the relevant copied data, based on an inversion of a bit state used to track the planned but yet to be copied data locations, along with unmapped (not planned to copy) data locations, (e.g., if a "1" bit is used to track an storage location corresponding to the planned but yet to be copied section, the bit may be flipped, by the live migration storage controller, to "0" when the source data corresponding to the storage location has been copied).

FIG. 1 is a system diagram depicting a system for tracking a progress of data copying for a live migration, according to some embodiments of the present disclosure.

Referring to FIG. 1, the system 1 may include a source server 100a (e.g., a normal source server) and a live migration server 100b. The source server 100a and the live migration server 100b may be part of a host system 1000 (e.g., a source host system). The source server 100a and the live migration server 100b may be connected to a source storage device 250a and a live migration storage device 250b. The source storage device 250a and the live migration storage device 250b may be connected to a source storage 200. The live migration server 100b may also be connected to a target storage device 250c. The target storage device 250c may be connected to a target storage 300. The source storage 200 and the target storage 300 may include storage locations (e.g., LBAs including LBA0 to LBA11 depicted within the source storage 200 for a simplified example), which may be associated with physical locations in the source storage 200 and the target storage 300 for storing data (e.g., a user's data).

The live migration server 100b may be connected to a target storage device 250c (e.g., a live migration target storage device) via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), Serial ATA (STATA), Small Computer Storage Interface (SCSI), etc.).

The target storage device 250c may include a target storage controller 210c. The target storage 300 may include a target memory 330, which may include (e.g., may be) a non-volatile memory and/or a volatile memory. For example, the target memory 330 may include a non-volatile memory and/or a memory tier (including volatile and non-volatile memory) and may correspond to non-volatile memories of one or more target storage devices 250c. The target storage device 250c may be connected to the target storage 300 via a storage interface 22d (e.g., a storage interface serving live migration copy write (LMCPW) operations (e.g., processes)). The storage interface 22d may include (e.g., may be) a flash interface (e.g., a NAND flash interface) or a remote interface (e.g., implemented by way of Ethernet).

The source server 100a may serve read and write requests from a user application. For example, a user may use an application (e.g., a word processing application) and send a user data write UDW (e.g., a user application data write) or a user data read UDR (e.g., a user application data read) to the source storage 200 (e.g., via a source storage device 250a).

The source server 100a may be connected to the source storage device 250a (e.g., a normal source storage device) via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), SATA, SCSI, etc.).

The source storage device 250a may include a source storage controller 210a and a source controller memory 220a. The source controller memory 220a may include (e.g., may be) random access memory (RAM) (e.g., static random access memory (SRAM) or dynamic random access memory (DRAM)). The source storage controller 210a may include (e.g., may be implemented by way of) embedded logic (e.g., embedded within the source storage device 250a) for handling requests from a server (e.g., the source server 100a) to write data to the source storage 200. The source storage device 250a may connect to the source storage 200 (or a portion of the source storage 200). The source storage 200 may include a source memory 230. The source memory 230 may include (e.g., may be) non-volatile memory and/or volatile memory. For example, the source memory 230 may include a non-volatile memory and/or a memory tier (including volatile and non-volatile memory) and may connect to one or more source storage devices 250a. The source storage device 250a may be connected to the source storage 200 via a storage interface 22a (e.g., a storage interface serving UDW operations) and a storage interface 22b (e.g., a storage interface serving user data read UDR operations). The storage interfaces 22a and 22b may include (e.g., may be) a flash interface (e.g., a NAND flash interface) or a remote interface (e.g., implemented by way of Ethernet).

The live migration server 100b may be a server that is assigned equal, lower, or higher privileges to access data within the system 1 than the source server 100a. The live migration server 100b may be assigned to manage a live migration operation (e.g., a live migration process) for copying data from the source storage 200 to the target storage 300. The live migration server 100b may include a live migration server memory 120b. The live migration server memory 120b may include (e.g., may be) random access memory (RAM) (e.g., static random access memory (SRAM) or dynamic random access memory (DRAM)). The live migration server memory 120b may be used to store metadata for managing the live migration operation. The live migration server 100b may be connected to a live migration storage device 250b via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), SATA or SCSI, etc.).

The live migration storage device 250b may be a storage device that is assigned equal, lower, or higher privileges to access data within the system 1 than the source storage device 250a or the target storage device 250c. The live migration storage device may be assigned to assist in the live migration operation for copying data from the source storage 200 to the target storage 300.

The live migration storage device 250b may include a live migration controller 210b and a live migration controller memory 220b. The live migration controller memory 220b may include (e.g., may be) random access memory (RAM) (e.g., static random access memory (SRAM) or dynamic random access memory (DRAM)). The live migration controller memory 220b may be used to store metadata for managing (e.g., monitoring, tracking, and/or directing) the live migration operation. The live migration controller 210b may include (e.g., may be implemented by way of) embedded logic (e.g., embedded within the live migration storage device 250b) for assisting the live migration server 100b in copying data from the source storage 200 to the target storage 300. The live migration storage device 250b may be connected to the source storage 200 via a storage interface 22c (e.g., a storage interface serving LMCPR operations). The storage interface 22c may include (e.g., may be) a flash interface (e.g., a NAND flash interface) or a remote interface (e.g., implemented by way of Ethernet).

The live migration server 100b may be connected (e.g., linked) to the source server 100a via a live migration server to source link 10. The live migration server to source link 10 may be implemented by a variety of technologies depending on whether the system 1 is implemented via hardware ("HW"), software ("SW"), or a combination of hardware and software. For example, it should be understood that the servers and storage devices of the system 1 may be implemented via HW, SW, or a combination of HW and SW. For example, in some embodiments, the live migration server to source link 10 may be a physical network connection (e.g., Ethernet). In some embodiments, one or more of the servers (e.g., the source server 100a or the live migration server 100b) may be software entities. For example, one or more of the servers may be virtual machines VMs managed by a hypervisor associated with one or more central processing units (CPUs). Likewise, one or more of the storage devices may be implemented by way of HW and/or SW techniques. For example, one or more of the source storage device 250a, the live migration storage device 250b, and the target storage device 250c may be different virtual machines implemented on one or more physical devices. For example, the source storage 200 and/or the target storage 300 may be logical partitions of the same physical medium (e.g., the source storage 200 may be a first namespace and the target storage 300 may be a second namespace).

The live migration server 100b and the live migration controller 210b may coordinate a management or tracking of a live migration process by communicating metadata (e.g., status identifier bits) that are indicative of a status of data corresponding to the storage locations (e.g., LBAs) in the source storage 200. For example, the live migration server 100b may send one or more copy read requests to the live migration controller 210b in reference to status identifier bits (e.g., 1's) in the live migration server memory 120b. The live migration controller 210b may work on mapping to the relevant data (e.g., "valid" data), within the source storage 200, to be copied to the target storage 300. The live migration controller 210b may create a first data structure M1 (e.g., a first bitmap) of metadata corresponding to the source storage. For example, at a mapping stage of the live migration process, the first data structure M1 may be referred to as a bitmap of mapped pages (e.g., "BMP" or bitmap mapped page), each mapped page (e.g. LBA) being a logic unit of storage (e.g., a page) in the source storage 200. The first data structure M1 may be created (e.g., temporarily stored) in the live migration controller memory 220b.

The first data structure M1 may include bits (e.g., first status identifier bits), each bit of the first status identifier bits indicating whether or not a given storage location (e.g., LBA) includes valid data to be copied to the target storage 300. Each LBA, which may include, for example, 4 kilobytes (KB) of data, may be represented by one status identifier bit in the bitmap of the first data structure M1. For example, a "0" bit may indicate that a given LBA has no valid data to be copied to the target storage 300, and a "1" bit may indicate that a given LBA does have valid data to be copied to the target storage 300. Thus, an entire drive having a large storage capacity, for example, 8 terabytes (TB) of data in the source storage 200, may be represented by way of a bitmap having, for example, 2048 megabits of metadata. For example, the live migration controller 210b may map the source storage 200 based on the request from the live migration server 100b, and may set first status identifier bits indicating a location of a source data to be copied MD1 (e.g., 1's) in the first data structure M1 to identify data locations to be copied from the source storage 200 to the target storage 300. (The first status identifier bits indicating a location of a source data to be copied MD1 may be bits, corresponding to the first data structure M1, indicating that a corresponding storage location includes data to be copied from the source storage to the target storage.)

When the live migration controller 210b has finished mapping the source storage 200, the live migration controller 210b may transfer (e.g., via a bitmap transfer request-response) the first data structure M1 (including the first status identifier bits indicating a location of a source data to be copied MD1) to the live migration server 100b, shown as a host version of the first data structure M1 (or a first data structure M1') in the live migration server memory 120b of FIG. 1. The live migration server 100b may use the host version of the first data structure M1' to work on copying the relevant data from the source storage 200 to the target storage 300 (e.g., via a live migration copy (LMCP) process, including a live migration copy read operation (e.g., process) LM-CP-Read, or LMCPR, and a live migration copy write operation LM-CP-Write, or LMCPW). For example, the live migration server 100b may use the host version of the data structure M1' to perform the LMCP process, where the live migration server 100b reads data from the source storage 200 (e.g., during LMCPR) and the live migration server 100b writes the data to the target storage 300 (e.g., during LMCPW). In summary, the live migration controller 210b may transfer (e.g., bitmap transfer) the first data structure M1 from the live migration controller memory 220b to the live migration server memory 120b. The version of the first data structure M1 in the live migration host memory 120b may be referred to as the host version of the first data structure M1' (e.g., a bitmap request and transfer) or simply the first data structure M1' (also known as a "host snapshot"). A host version HV may refer to any host version of a data structure (e.g., an initial BMP, initial BDP, or subsequent BDP) used by the live migration server 100b to work on copying relevant data from the source storage 200 to the target storage 300.

User data writes UDW to the source storage 200 may occur during the process of copying and writing the data from the source storage 200 to the target storage 300. To track the locations of the user data writes UDW, the live migration controller 210b may create a second data structure M2 (e.g., a second bitmap) of metadata, which may be referred to as a bitmap of "dirty" pages ("BDP"). For example, the second data structure M2 may be created to indicate which storage locations (e.g., LBAs) correspond to the user data writes UDW and, thus, have data to be copied to the target storage 300 in the next iteration. The second data structure M2 may be transferred (e.g., bitmap transferred) to live migration server 100b by the live migration controller 210b (e.g., in response to completion of copying based on the first data structure M1). The live migration server 100b may use a host version of the second data structure M2' (or a second data structure M2') (e.g., a host version HV corresponding to the second data structure M2 created by the live migration controller 210b) as a reference for data to be copied from the source storage 200 to the target storage 300 at a later iteration by the live migration server 100b. For example, the host version of the second data structure M2' may be a BDP that may be used by the live migration server 100b to update the relevant data at the target storage 300, based on a change to the relevant data at the source storage 200.

Figure 2:
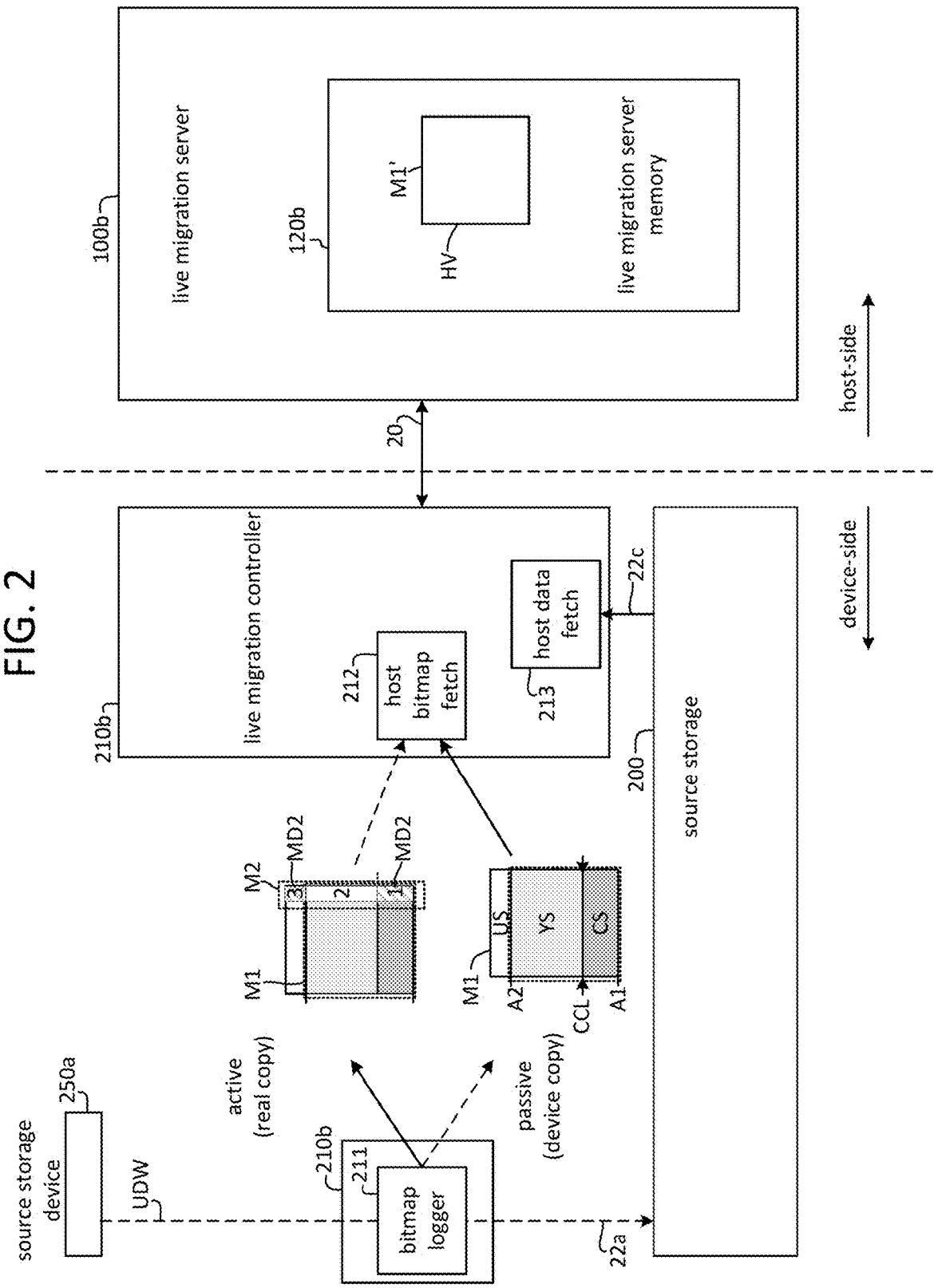
FIG. 2 is a simplified conceptual diagram depicting a transferring of a passive first data structure and a tracking of user data writes with an active second data structure, according to some embodiments of the present disclosure.
Figure 3:
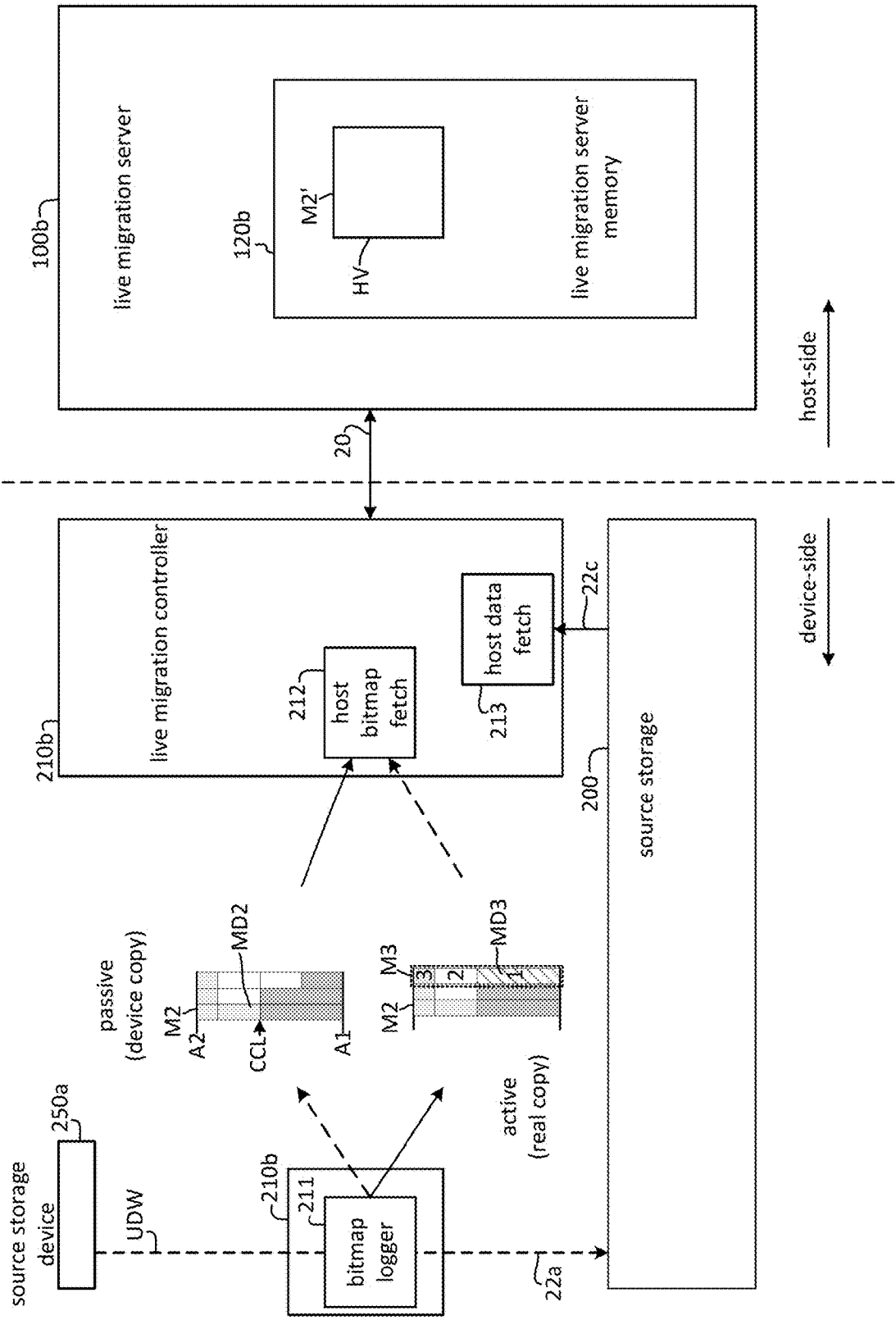
FIG. 3 is a simplified conceptual diagram depicting a transferring of a passive version of the second data structure and a tracking of user data writes with an active third data structure, according to some embodiments of the present disclosure.

In summary, three distinct operations may be performed. First, the live migration controller 210b may transfer an initial data structure (e.g., the first data structure M1, or the second data structure M2) to the live migration server 100b causing a host version of the first data structure M1' or a host version of the second data structure M2' to be created in the live migration server 100b. Second, the live migration server 100b may perform a copying process in reference to the host version of the first data structure M1' or the host version of the second data structure M2' while the live migration controller 210b tracks user data writes UDW as dirty bits in a subsequent data structure (e.g., the second data structure M2, if the initial data structure was the first data structure M1, or a third data structure M3, if the second data structure M2 was the initial data structure). Third, when the copying process is done, the live migration server 100b may request a transfer of the next data structure (e.g., the next bitmap data structure) from the live migration controller 210b. When the live migration server 100b receives a transfer of the next data structure, another iteration of the three distinct operations may be performed. (FIG. 1 is discussed again further below. FIG. 2 and FIG. 3 discuss details regarding the tracking and transferring of data structures in reference to a first data structure M1, a second data structure M2, and a third data structure M3.)

FIG. 2 is a simplified conceptual diagram depicting a transferring of a passive first data structure and a tracking of user data writes with an active second data structure, according to some embodiments of the present disclosure.

FIG. 3 is a simplified conceptual diagram depicting a transferring of a passive version of the second data structure and a tracking of user data writes with an active third data structure, according to some embodiments of the present disclosure.

Referring to FIG. 2, as discussed above, the live migration controller 210b may create (e.g., provide) a first data structure M1 that may be a BMP towards (e.g., at) the beginning of the live migration process. In response to a request from the live migration server 100b, the live migration controller 210b may also create a second data structure M2 that may be a BDP (e.g., during the live migration BMP transfer from the live migration controller 210b to the live migration server 100b and during the live migration copying process) for incremental (e.g., iterative) updates to the data in the target storage 300. For example, the second data structure M2 that is a BDP may track (e.g., identify) locations of user data writes UDW from the source storage device 250a that may have occurred at the relevant data locations in the source storage 200 during or after a transferring of the first data structure M1 that is a BMP, and during a subsequent live migration copy operation LMCP (including a live migration copy read operation LMCPR and/or a live migration copy write operation LMCPW).

For example, at a mapping stage of the live migration process, the first data structure M1 may be the BMP. The live migration server 100b may request a copy of the BMP (e.g., the live migration server 100b may send a "query BMP" command to the live migration controller 210b (e.g., a host bitmap fetch 212)). The live migration controller 210b may prepare a buffer as the first data structure M1 (e.g., a location in the live migration controller memory 220b, shown in FIG. 1) for the BMP. The live migration controller 210b may set first status identifier bits indicating a location of a source data to be copied MD1 as mapped bits (e.g., one or more 1's) into the first data structure M1 that is a BMP buffer for every page (or LBA) of a mapping operation that has valid data. When the mapping operation is complete, the first data structure M1 that is a BMP may become a passive bitmap (e.g., the BMP may no longer be available for updates to the bits of the bitmap) and the live migration controller 210b may transfer (e.g., bitmap transfer) the first data structure M1 content, first status identifier bits indicating a location of a source data to be copied MD1, (e.g., send the BMP) to the live migration server memory 120b in the live migration server 100b. The live migration server 100b may receive and store a host version of the first data structure M1' that is a BMP in the live migration server memory 120b, read the mapped pages, in reference to the host version of the first data structure M1', from the source storage 200, and copy over the relevant data (e.g., via a host data fetch 213 and a corresponding Live Migration Server Copy Write LMCPW) to the target storage 300 (see FIG. 1).

As discussed above, the live migration controller 210b may create a second data structure M2, which may be a first BDP, to track updates to the relevant locations of the source storage 200 that occur during or after the transferring (e.g., the bitmap transferring) of the first data structure M1 (e.g., a BMP) and the subsequent live migration copy operation LMCP. For example, the live migration controller 210b may prepare a second data structure M2 (e.g., that is an active BDP buffer, or active bitmap buffer) having all bits cleared to "0" initially. A bitmap logger 211 may monitor (e.g., "snoop") user data writes UDW from the source storage device 250a, and may set second status identifier bits indicating a location of a source data to be copied MD2 (e.g., to "1" bits) in the active second data structure M2 during the current live migration copy LMCP operation to identify the relevant locations of the user data writes UDW. (The second status identifier bits indicating a location of a source data to be copied MD2 may be bits, corresponding to the second data structure M2, indicating that a corresponding storage location includes data to be copied from the source storage to the target storage.)

In some embodiments, when the live migration server 100b has finished the live migration copying operations corresponding to the passive bitmap (e.g., a buffer for the passive first data structure M1 or a subsequent passive second data structure M2), the live migration server 100b may send a command (e.g., a "swap BDP" command) to swap the active bitmap buffer and the passive bitmap buffer.

For example, and referring to FIG. 3, in some embodiments, the buffer corresponding to the passive first data structure M1 may become an active third data structure M3 buffer (e.g., for a second or subsequent BDP bitmap) and the first active second data structure M2 buffer may become a passive second data structure M2 buffer. The live migration server 100b may send a command (e.g., a "query BDP" command) to the live migration controller 210b to transfer (e.g., bitmap transfer) the passive buffer (e.g., copy a passive second data structure M2 corresponding to the passive buffer) to the live migration server 100b in a host version of the second data structure M2'. In some embodiments, when the passive bitmap has been transferred to the live migration server 100b (e.g., as a bitmap transfer, or host version HV), the live migration controller 210b may reset the passive bitmap buffer (e.g., clear all of the bits to "0") and prepare it for tracking as an active bitmap buffer for the next BDP (e.g., a third data structure M3 having third status identifier bits indicating a location of a source data to be copied MD3). (The third status identifier bits indicating a location of a source data to be copied MD3 may be bits, corresponding to the third data structure M3, indicating that a corresponding storage location includes data to be copied from the source storage to the target storage.) The live migration server 100b may parse the host version of the second data structure M2' (e.g., the BDP), read the dirty pages from the source storage 200 (in reference to the host version of the second data structure M2'), and copy over the relevant data to the target storage 300.

Referring again to FIG. 1, in some embodiments, and as discussed further below in reference to FIGS. 5-13, the live migration controller 210b may monitor (e.g., "snoop") user data writes UDW from the source storage device 250a to the source storage 200. The live migration controller 210b may monitor a current copying location CCL associated with LMCPR and LMCPW operations of the live migration server 100b.

In some embodiments, the live migration controller 210b may use the current copying location CCL, a starting (or start) address A1 (e.g., a starting address of a planned to copy section), and an ending (or end) address A2 (e.g., an ending address of the planned to copy section) to track a planned and copied section CS and a planned but yet to be copied section YS of the source storage 200. For example, as depicted in FIG. 1, LBA0 to LBA8 may correspond to a planned to copy section (e.g., a section of the source storage 200 that the live migration server 100b has been assigned to copy to the target storage 300). LBA0 to LBA2 may correspond to the planned and copied section CS at a first time $t_1$, and LBA3 to LBA8 may correspond to the planned but yet to be copied section YS at the first time $t_1$. LBA9 to LBA11 may correspond to an unmapped section US (e.g., a section of the source storage 200 that is not planned to be copied). For example, the current copying location CCL may be associated with a current copy index corresponding to a start address A1 of a continuous index and to an end address A2 of the continuous index, the continuous index being associated with the planned to copy section, which includes contiguous storage locations (e.g., LBAs) between the start address A1 and the end address A2.

In some embodiments, when the storage locations (e.g., LBAs) that are planned to be copied are not all adjacent to each other (e.g., are not all contiguous or are distributed), the live migration controller 210b may use the current copy location CCL along with one or more bitmap notations/representations (e.g., instead of a starting address A1 and an ending address A2) to track the planned and copied section CS and the planned but yet to be copied section YS of the source storage 200. A bitmap may be a data structure including a collection of 1's and/or 0's with position information (see, e.g., FIG. 4 and the related description below).

The live migration controller 210b may monitor user data writes UDW that occur during and after the bitmap transferring of the first data structure M1 to the live migration server 100b, when the live migration copying is in progress (e.g., during the LMCPR and LMCPW processes), and before all data is copied. The live migration controller 210b may create a second data structure M2 and track (e.g., record) the locations of the user data writes UDW with second status identifier bits indicating a location of a source data to be copied MD2 (e.g., "dirty" bits) in the second data structure M2. The second data structure M2 may be transferred to the live migration server 100b after the first LMCP process (e.g., including LMCPR and LMCPW operations) has been completed to indicate to the live migration server 100b where relevant source data has changed (e.g., where the user data writes UDW have been written) so that the live migration server 100b may perform another LMCP iteration (e.g., a later iteration) including another LMCPR operation to copy the source data (from the locations identified by the one or more second status identifier bits indicating a location of a source data to be copied MD2) at the source storage 200 and another LMCPW operation to update the data at the target storage 300.

For example, a first user data write UDW1 may be written to LBA0 to LBA9 at the first time $t_1$ (e.g., when the current copying address CCL corresponds to LBA2). In some embodiments, the live migration controller 210b may generate the second status identifier bits indicating a location of a source data to be copied MD2 in the second data structure M2 corresponding to each LBA address LBA0 to LBA9 to be included in the second data structure M2 for use by the live migration server 100b to track user data writes UDW to the source storage device 250a when copying valid data (associated with the host version of the first data structure M1') from the source storage 200 during the next LMCP process. However, at $t_1$, addresses LBA3 to LBA8 are scheduled to be copied and written to the target storage 330 based on the first data structure M1', but have not yet been so copied and written. Accordingly, if the addresses LBA3 to LBA8 were included in the second data structure M2 and sent to the live migration server 100b, the source data corresponding to LBA3 to LBA8 would be copied twice (e.g., read twice from the source storage 200 and written twice to the target storage 300) from the source storage 200—once based on the first data structure M1' and once based on the second data structure M2'. Accordingly, the next LMCPR and LMCPW iteration may include redundant reads and writes if LBA3 to LBA8 were copied again from 200 to 300. It may be wasteful to consume time and power redundantly copying the source data corresponding to LBA3 to LBA8, which was previously copied to the target storage 300 in the prior iteration. Furthermore, the drawbacks associated with redundant copying may have a cumulative effect by creating more BDP runs (e.g., more iterations of LMCPR and LMCPW operations to update data at the target storage 300).

In some embodiments, as discussed further below in reference to FIGS. 5-13, to reduce (e.g., to eliminate) redundant copying, the live migration controller 210b may selectively generate or selectively clear second status identifier bits indicating a location of a source data to be copied MD2 (e.g., dirty bits) in the second data structure M2 (and/or subsequent iterations of LMCP processes).

For example, in some embodiments involving selective generation methods, the live migration controller 210b may use the tracking of the planned and copied section CS and/or the planned but yet to be copied section YS to filter the generation of second status identifier bits indicating a location of a source data to be copied MD2 (e.g., dirty bits) in the second data structure M2 (and/or subsequent iterations of LMCP processes), such that the tracking of the planned but yet to be copied section disables (or prevents) the live migration controller 210 from generating the second status identifier bits indicating a location of a source data to be copied MD2 in the second data structure M2 (e.g., for those current copying locations CCL overlapping with the planned but yet to be copied bitmap YBM). For example, the live migration controller 210b may selectively generate the second status identifier bits indicating a location of a source data to be copied MD2 in the second data structure M2 so that the live migration server 100b may reduce (e.g., avoid) redundant copying at the next LMCP iteration, when referring to the second data structure M2 bitmap transferred by the live migration controller 210b.

In some embodiments involving selective clearing methods, instead of using the tracking of the planned and copied section CS and/or the planned but yet to be copied section YS to filter the generation of second status identifier bits indicating a location of a source data to be copied MD2 in the second data structure M2, the live migration controller 210 may track and set the second status identifier bits indicating a location of a source data to be copied MD2 in the second data structure M2 based on the occurrence of user data writes UDW but, later, clear the second status identifier bits indicating a location of a source data to be copied MD2 from the second data structure M2 if the second status identifier bits indicating a location of a source data to be copied MD2 correspond to a current copying location CCL of the live migration server.

As used herein, "tracking" a section (e.g., a planned but yet to be copied section YS and/or a planned and copied section CS of the source storage 200) may mean remaining aware of, or maintaining a record of, storage locations (e.g., LBAs) within a set of storage locations (e.g., LBAs) associated with the section and/or remaining aware of, or maintaining a record of, storage locations (e.g., LBAs) outside of (e.g., not within) the set of storage locations (e.g., LBAs) associated with the section.

As used herein, "filtering" the generating of status identifiers (e.g., second status identifier bits indicating a location of a source data to be copied MD2) may mean generating status identifiers in some circumstances and not generating status identifiers in some other circumstances.

For example, in some embodiments, after the first data structure M1 has been transferred to the live migration server, a live migration (LM) copy status data structure of the first data structure M1 (e.g., the first data structure M1 or another data structure or other data structures, based on the first data structure M1 and also separate and distinct from the second data structure M2) may be effectively used as a filter before setting status identifier bits (e.g., second status identifier bits indicating a location of a source data to be copied MD2) in the second data structure M2 to identify the locations of user data writes to the source storage 200.

For example, a LM copy status data structure may be a data structure at the live migration controller 210b. The LM copy status data structure may be based on M1, but the LM copy status data structure may be a different data structure than M1. In some embodiments, the LM copy status data structure may include (e.g., may be) three different bitmaps and an index (e.g., an index indicating where the current copying location CCL is). In some embodiments involving a continuous section, the LM copy status data structure may include three indices (e.g., a start index, a current index, and an end index). In some embodiments involving non-continuous (or distributed) sections, the LM copy status data structure may include three bitmaps (e.g., a planned and copied bitmap CBM, a planned but yet to be copied bitmap YBM, and an unmapped section bitmap UBM. In some embodiments, the LM copy status data structure may include (e.g., may be) one bitmap and several indices. For example, one index may indicate where a mapped region begins (e.g., so a location before that index may be an unmapped location), one index may indicate where a current copy location CCL is, and one index may indicate where a final mapped entry is (e.g., so a location after that index may be an unmapped location again). It should be understood that other data structure and index embodiments are possible. In some embodiments, in which the LM copy status data structure is a data structure that is different from the first data structure M1, the planned but yet to be copied section YS may be initialized based on the first data structure M1.

For example, in some embodiments, the live migration controller 210b may initialize the LM copy status data structure of the first data structure M1 to track three sections, along with the current copying location CCL: (1) a planned and copied section CS (or a planned and copied bitmap CBM); (2) a planned but yet to be copied section YS (or a planned but yet to be copied bitmap YBM); and (3) an unmapped section US (or unmapped section bitmap UBM). For example, the live migration controller 210b may initialize all status identifier bits in the first data structure M1 (e.g., the LM copy status data structure of the first data structure) corresponding to the planned and copied section CS to 0's; the live migration controller 210b may initialize all status identifier bits in the first data structure M1 corresponding to the planned but yet to be copied section YS to all 1's/valid to match M1 (e.g., initialize the status identifier bits in the planned but yet to be copied section YS to 1's); and the live migration controller 210b may initialize all status identifier bits in the first data structure M1 corresponding to the unmapped section US to 1's (e.g., all status identifier bits in the unmapped section US may be 1's and may stay static (e.g., remain 1's) for an entire LMCP iteration).

In some embodiments, the first data structure M1 (or another data structure based on the first data structure M1) used for tracking the current copying location CCL may include more than one separate data structure for tracking the separate sections CS/CBM, YS/YBM, and/or US/UBM (see, e.g., FIGS. 4, 6, 7, and 8).

In some embodiments, the first data structure M1 (or another data structure based on the first data structure M1) used for tracking the current copying location CCL may include one data structure for tracking the separate sections CS/CBM, YS/YBM, and/or UM (see, e.g., FIG. 9).

Referring again to FIG. 1, in some embodiments, the live migration controller 210b may monitor (e.g., in parallel) for user data writes UDW and for LMCPR read LBAs. As the current copying location CCL changes (e.g., progresses), the live migration controller 210b may clear status identifier bits (e.g., planned but yet to be copied section status identifier bits indicating a location of a source data to be copied YS.MD1) (set the bits to 0's) in the planned but yet to be copied section YS, and set corresponding status identifier bits (e.g., planned and copied section status identifier bits indicating a location of a source data that has been copied CS.MD1) in the planned and copied section CS to 1's (see, e.g., FIG. 4B below). (The planned but yet to be copied section status identifier bits indicating a location of a source data to be copied YS.MD1 may be bits, corresponding to the planned but yet to be copied section YS of an LM copy status data structure, indicating that a corresponding storage location includes data that has not yet been copied from the source storage to the target storage. The planned and copied section status identifier bits indicating a location of a source data that has been copied CS.MD1 may be bits, corresponding to the planned and copied section CS of an LM copy status data structure, indicating that a corresponding storage location includes data that has been copied from the source storage to the target storage.) If a monitored user data write UDW corresponds to an LBA that corresponds to an entry of the first data structure M1 having a status identifier bit in the planned but yet to be copied section YS that is set to 1, the user data write UDW corresponding to that LBA address may not be tracked (e.g., by not setting second status identifier bits valid, to 1's) in the second data structure M2. If, on the other hand, a monitored user data write UDW corresponds to an LBA that corresponds to an entry of the first data structure M1 having a status identifier bit in the planned but yet to be copied section YS that is set to 0, the user data write UDW corresponding to that LBA address may be tracked (e.g., by setting second status identifier bits valid, to 1's) in the second data structure M2. Because the updated data from the user data write UDW may be copied by the live migration server based on the mapping in the first data structure M1, a redundant copy operation by the live migration server 100b may be prevented by filtering the update (e.g., preventing the generation of dirty bits) to the second data structure M2. For example, by not setting second status identifier bits indicating a location of a source data to be copied MD2 valid to 1's (e.g., by filtering the update to the second data structure M2), a redundant copy operation by the live migration server 100b may be prevented. For example, without the selective generation method applied, second status identifier bits indicating a location of a source data to be copied MD2 may be set to 1's that may lead to redundant copying.

For example, as depicted in FIG. 1, a first user data write UDW1 at a first time $t_1$ may write at LBA locations associated with one of the three sections in the first data structure M1 (or another data structure based on the first data structure M1) (the planned and copied section CS, the planned but yet to be copied section YS, and the unmapped section US). The live migration controller 210b may refer to the first data structure M1 (or another data structure based on the first data structure M1) and allow only the user data writes UDW corresponding to the planned and copied section CS or the unmapped section US to be set as second status identifier bits indicating a location of a source data to be copied MD2 (e.g., 1's) in the second data structure M2, while not allowing the user data writes UDW corresponding to the planned but yet to be copied section YS to be set as second status identifier bits indicating a location of a source data to be copied MD2 in the second data structure M2. (See also the flowchart of FIG. 12.)

In some embodiments, as discussed further below in reference to FIG. 10 and FIG. 13, to reduce (e.g., to eliminate) redundant copying, the live migration controller 210b may track the current copying location CCL, without referencing a planned and copied section CS or a planned but yet to be copied section YS. In such embodiments, the live migration controller 210b may monitor and track user data writes UDW, occurring during or after the bitmap transferring of the first data structure M1 to the live migration server 100b (e.g., during the live migration server copying, and before the live migration server copying finishes). In the meantime, the live migration server 100b may generate the second status identifier bits indicating a location of a source data to be copied MD2 in the second data structure M2 according to the user data writes UDW without filtering or preventing the generation of the second status identifier bits indicating a location of a source data to be copied MD2 corresponding to a planned but yet to be copied section. In such embodiments, the live migration controller 210b may monitor the current copying location CCL and may clear the second status identifier bits indicating a location of a source data to be copied MD2 (e.g., the "dirty" bits) from the second data structure M2 corresponding to the current copying location CCL, because the associated source data has been copied by the live migration server 100b (as indicated by the current copying location CCL). Accordingly, the live migration controller 210b may selectively clear the second status identifier bits indicating a location of a source data to be copied MD2 in the second data structure M2 so that the live migration server 100b may reduce (e.g., avoid) redundant copying at the next LMCPR and LMCPW iteration, when referring to the second data structure M2 transferred by the live migration controller 210b. (See also the flowchart of FIG. 13.)

In some embodiments, the live migration controller 210b may generate the second status identifier bits indicating a location of a source data to be copied MD2 to indicate locations of user data writes UDW occurring outside of the planned to copy section (e.g., in the unmapped section US).

FIG. 4A, FIG. 4B, FIG. 4C, FIG. 4D, FIG. 4E, FIG. 4F, FIG. 4G, and FIG. 4H (collectively, FIG. 4) are simplified conceptual diagrams depicting details of a bitmap vision diagram for depicting methods for tracking a progress of data copying for a live migration, according to some embodiments of the present disclosure.

Referring to FIG. 4A, a host version of the first data structure M1' may be in the live migration server memory 120b for use in performing an LMCP operation (see FIG. 1). The bitmap may represent source data in the source storage 200 associated with, for example, LBA0 to LBA49. First status identifier bits indicating a location of a source data to be copied MD1 (e.g., the "1" bits) may indicate source data (e.g., valid or dirty data) for copying from the source storage 200 to the target storage 300. The current copying location CCL may progress from a starting address A1 to an ending address A2 between a zeroth time $t_0$ to a third time $t_3$. The bitmap locations at a top row above the ending address A2 may correspond to an unmapped section US.

Referring to FIG. 4B, the first data structure M1 (or one or more other data structures, as discussed above with reference to FIG. 1) may be located in the live migration controller memory 220b to track a progress of the current copying location CCL. For example, as depicted in FIG. 4B with respect to a first time $t_1$, the first data structure M1 may be used by the live migration controller 210b to track the progress of the current copying location CCL by clearing status identifier bits (e.g., planned but yet to be copied section status identifier bits indicating a location of a source data to be copied YS.MD1) (clearing the bits to 0's) from the first data structure M1 corresponding to the planned but yet to be copied section YS, and adding (e.g., respectively adding) status identifier bits (e.g., planned and copied section status identifier bits indicating a location of a source data that has been copied CS.MD1) to the first data structure M1 corresponding to the planned and copied section CS. For example, as the current copying location CCL progresses, an amount of planned and copied section status identifier bits indicating a location of a source data that has been copied CS.MD1 (e.g., 1's) may increase in the planned and copied section CS and an amount of planned but yet to be copied section status identifier bits indicating a location of a source data to be copied YS.MD1 (e.g., 1's) may decrease (e.g., respectively decrease) in the planned but yet to be copied section YS. An amount of unmapped section status identifier bits US.MD1 may not increase or decrease in a given iteration. (The unmapped section status identifier bits US.MD1 may be bits, corresponding to the unmapped section US of an LM copy status data structure, indicating that a corresponding storage location is outside of the planned to copy section.)

Referring to FIG. 4C, a second data structure M2 may be in the live migration controller memory 220b and activated, with each bit initially set to "0," for tracking user data writes UDW from the source storage device 250a occurring between the zeroth time $t_0$ and the third time $t_3$. In FIGS. 4C to 4F, the current copying location CCL sections (e.g., YS, CS, and UM) are illustrated next to the second data structure M2 to depict how the planned and copied section CS and the planned but yet to be copied section YS respectively change in size and correspond to the filtering of the generation of second status identifier bits indicating a location of a source data to be copied MD2 (e.g., "1" bits) in the second data structure M2.

At the zeroth time $t_0$, each bit between the starting address A1 and the ending address A2 may correspond to a planned but yet to be copied section YS.

Referring to FIG. 4D, at the first time $t_1$, a first user data write UDW1 may occur at LBA0 to LBA9. According to some embodiments, the second status identifier bits indicating a location of a source data to be copied MD2 (e.g., dirty bits in a BDP) may be generated in the second data structure M2 locations corresponding to LBAs in the planned and copied section CS and in the unmapped section US, while second status identifier bits indicating a location of a source data to be copied MD2 (e.g., dirty bits, or 1's) may not be generated in the second data structure M2 locations corresponding to LBAs in the planned but yet to be copied section YS (e.g., LBA3 to LBA8).

Referring to FIG. 4E, a similar filtering of the generation of dirty bits may occur based on a second user data write UDW2 at a second time $t_2$ (occurring at LBA10 to LBA19). For example, second status identifier bits indicating a location of a source data to be copied MD2 (e.g., dirty bits, or 1's) may not be generated in the second data structure M2 locations corresponding to LBAs in the planned but yet to be copied section YS (e.g., LBA16 to LBA18). Referring to FIG. 4F, a third data write UDW3 occurring at the third time $t_3$ (occurring at LBA20 to LBA29) may generate one or more second status identifier bits indicating a location of a source data to be copied MD2 throughout the bitmap locations corresponding to LBA20 to LBA29 because each location corresponds to the planned and copied section CS at the third time $t_3$.

Referring to FIG. 4G and FIG. 4H, a sequence of user data write UDW times and locations and resulting filtered status identifiers (e.g., dirty bits) may be represented in a bitmap vision diagram (e.g., a diagram used to depict a selective generating or selective clearing of status identifiers in a data structure that is used for indicating locations of user data writes to a source storage). For example, FIG. 4G depicts a final version of the second data structure M2 (e.g., the BDP) generated in FIGS. 4C to 4F with "1" and "0" bits shown. FIG. 4H depicts the final version of the second data structure M2, generated in FIGS. 4C to 4F, superimposed over the first data structure M1, with each tracked user data write UDW divided into sections for simplicity. The second data structure M2 is illustrated as being superimposed over the first data structure M1 in the bitmap vision diagrams to depict how the progress of the current copying location CCL corresponds to the filtering of the generation of second status identifier bits indicating a location of a source data to be copied MD2 (e.g., "1" bits) in the second data structure M2.

For example, the first user data write UDW1 is divided into three sections—1, 2, and 3; the second user data write UDW2 is divided into three sections—4, 5, and 6; and the third user data write UDW3 is divided into two sections—7 and 8. Sections 1, 4, and 7 depict bitmap locations corresponding to LBAs in the planned and copied section CS at the time of their respective user data writes UDW; sections 2 and 5 depict bitmap locations corresponding to LBAs in the planned but yet to be copied section YS at the time of their respective user data writes UDW; and sections 3, 6, and 8 depict bitmap locations corresponding to LBAs in the unmapped section US where user data writes UDW occurred.

FIG. 5A, FIG. 5B, FIG. 5C, and FIG. 5D (collectively, FIG. 5) are bitmap vision diagrams depicting a method for tracking a progress of data copying for a live migration using a continuous index associated with contiguous storage locations and a selective generation of second status identifiers in a second data structure, according to some embodiments of the present disclosure.

Referring to FIG. 5, the previous descriptions for FIGS. 4C to 4F may be depicted in a series of bitmap vision diagrams. To summarize, in some embodiments, the live migration controller 210b may monitor a copy index (e.g., the current copy location CCL) of the first data structure M1 (e.g., a BMP or a previous BDP) and may disable or prevent the generation of second status identifier bits indicating a location of a source data to be copied MD2 in locations of the second data structure M2 corresponding to LBAs above the current copy location CCL in the planned to copy section (e.g., corresponding to the planned but yet to be copied section YS). Thus, a final version of the second data structure M2 may be filtered of dirty bits that may cause a redundant copying (e.g., as depicted by the user data write UDW sections 2 and 5 depicted in FIGS. 5B to 5D).

Aspects of embodiments of the present disclosure depicted in FIGS. 6 to 10 are discussed using bitmap vision diagrams.

FIG. 6A, FIG. 6B, FIG. 6C, FIG. 6D and FIG. 6E (collectively, FIG. 6) are bitmap vision diagrams depicting a method for tracking a progress of data copying for a live migration using a planned but yet to be copied bitmap and a planned and copied bitmap associated with distributed storage locations, according to some embodiments of the present disclosure.

In some embodiments, a first data structure M1 may correspond to source data in the source storage 200 that is not located in a continuous block. For example, the storage locations (e.g., LBA addresses) associated with the relevant data in the source storage 200 to be copied to the target storage 300 may not be adjacent to each other (e.g., may be distributed).

Referring to FIG. 6, gaps GAP have been added to the bitmap vision diagrams in FIGS. 6A to 6D to depict non-adjacent bitmap locations corresponding to such distributed (e.g., non-adjacent) storage locations (e.g., LBA addresses). In such situations, the current copying location CCL may be tracked by way of a planned but yet to be copied bitmap YBM and a planned and copied bitmap CBM. The progression of the current copying location CCL may be seen by the shaded portions corresponding to bitmap bits (e.g., status identifiers) indicating a location of a first distributed address D1, a second distributed address D2, a third distributed address D3, and a fourth distributed address D4 (see the enlarged bitmap depicted in FIG. 6E).

Figure 6D:
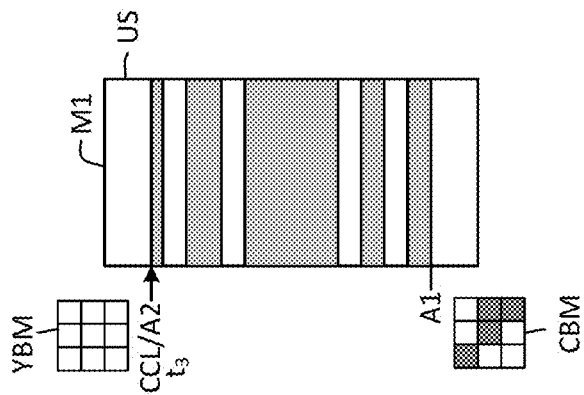
FIG. 6A, FIG. 6B, FIG. 6C, FIG. 6D and FIG. 6E (collectively, FIG. 6) are bitmap vision diagrams depicting a method for tracking a progress of data copying for a live migration using a planned but yet to be copied bitmap and a planned and copied bitmap associated with distributed storage locations, according to some embodiments of the present disclosure.
Figure 6C:
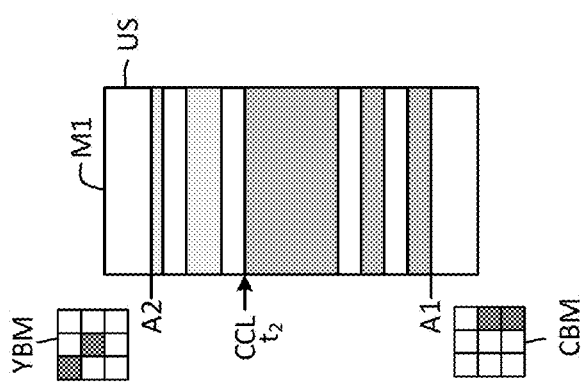
Figure 6B:
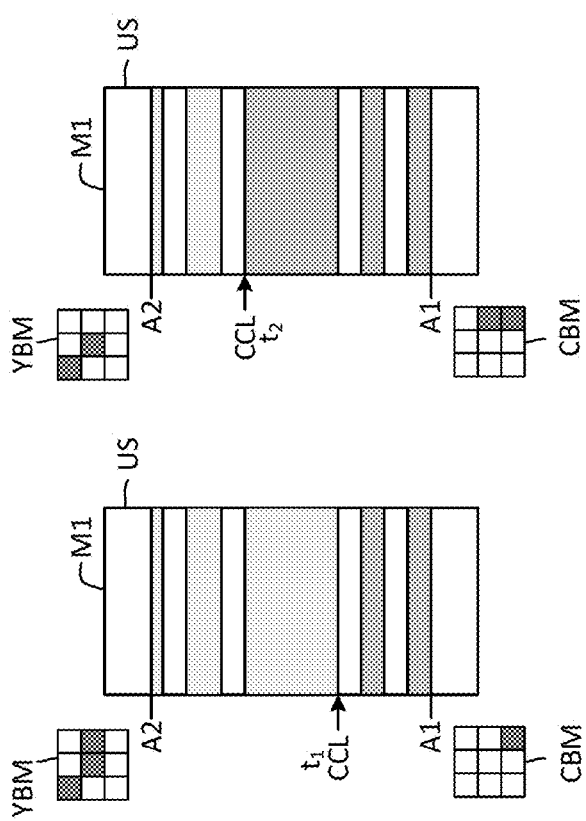
Figure 6A:
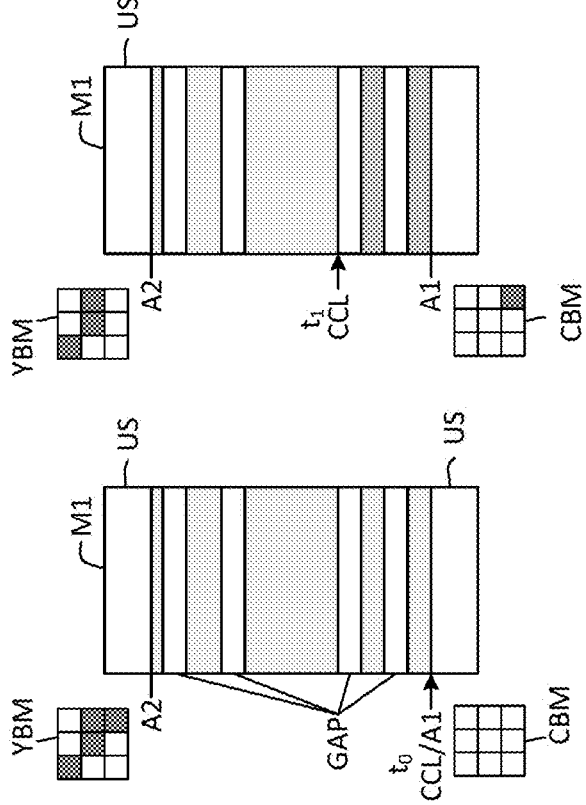
Figure 6E:
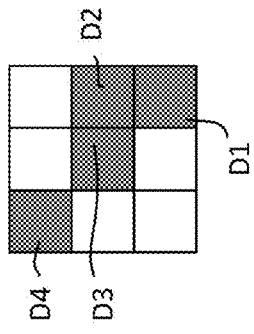

Referring to FIG. 6A, the status identifiers (e.g., 1 bits) associated with each of the first distributed address D1, the second distributed address D2, the third distributed address D3, and the fourth distributed address D4 may all be in the planned but yet to be copied bitmap YBM at a zeroth time $t_0$. For example, an LMCP process based on the first data structure M1 indicating distributed storage locations (e.g., D1 to D4) may have not yet begun at a time depicted in FIG. 6A, such that all of the distributed storage locations are indicated by (e.g., within) the planned but yet to be copied bitmap YBM. Referring to FIG. 6B, at a first time $t_1$, the LMCP process based on the first data structure M1 indicating distributed storage locations (e.g., D1 to D4) may be in progress with the data associated with the first distributed address D1 having been copied. Thus, the corresponding status identifier associated with the first distributed address D1 may be removed from the planned but yet to be copied bitmap YBM and added to the planned and copied bitmap CBM. The process may continue until all of the status identifiers associated with the first distributed address D1, the second distributed address D2, the third distributed address D3, and the fourth distributed address D4 are removed (e.g., cleared) from the planned but yet to be copied bitmap YBM and added to the planned and copied bitmap CBM.

For example, and referring to FIG. 6C, at a second time $t_2$, the LMCP process based on the first data structure M1 indicating distributed storage locations (e.g., D1 to D4) may be in progress with the data associated with the first distributed address D1 and the second distributed address D2 having been copied. Thus, the corresponding status identifier associated with the second distributed address D2 may be removed from the planned but yet to be copied bitmap YBM and added to the planned and copied bitmap CBM. Referring to FIG. 6D, at a third time $t_3$, the LMCP process based on the first data structure M1 indicating distributed storage locations (e.g., D1 to D4) may be completed, with the data associated with the first distributed address D1, the second distributed address D2, the third distributed address D3, and the fourth distributed address D4 having been copied. Thus, the corresponding status identifiers associated with the third distributed address D3 and the fourth distributed address D4 may be removed from the planned but yet to be copied bitmap YBM and added to the planned and copied bitmap CBM.

FIG. 7A, FIG. 7B, FIG. 7C, and FIG. 7D (collectively, FIG. 7) are bitmap vision diagrams depicting a method for tracking a progress of data copying for a live migration using the planned but yet to be copied bitmap and the planned and copied bitmap associated with the distributed storage locations of FIG. 6 and a selective generation of second status identifiers in a second data structure, according to some embodiments of the present disclosure.

Figures 7A, 7B, 7C, 7D:
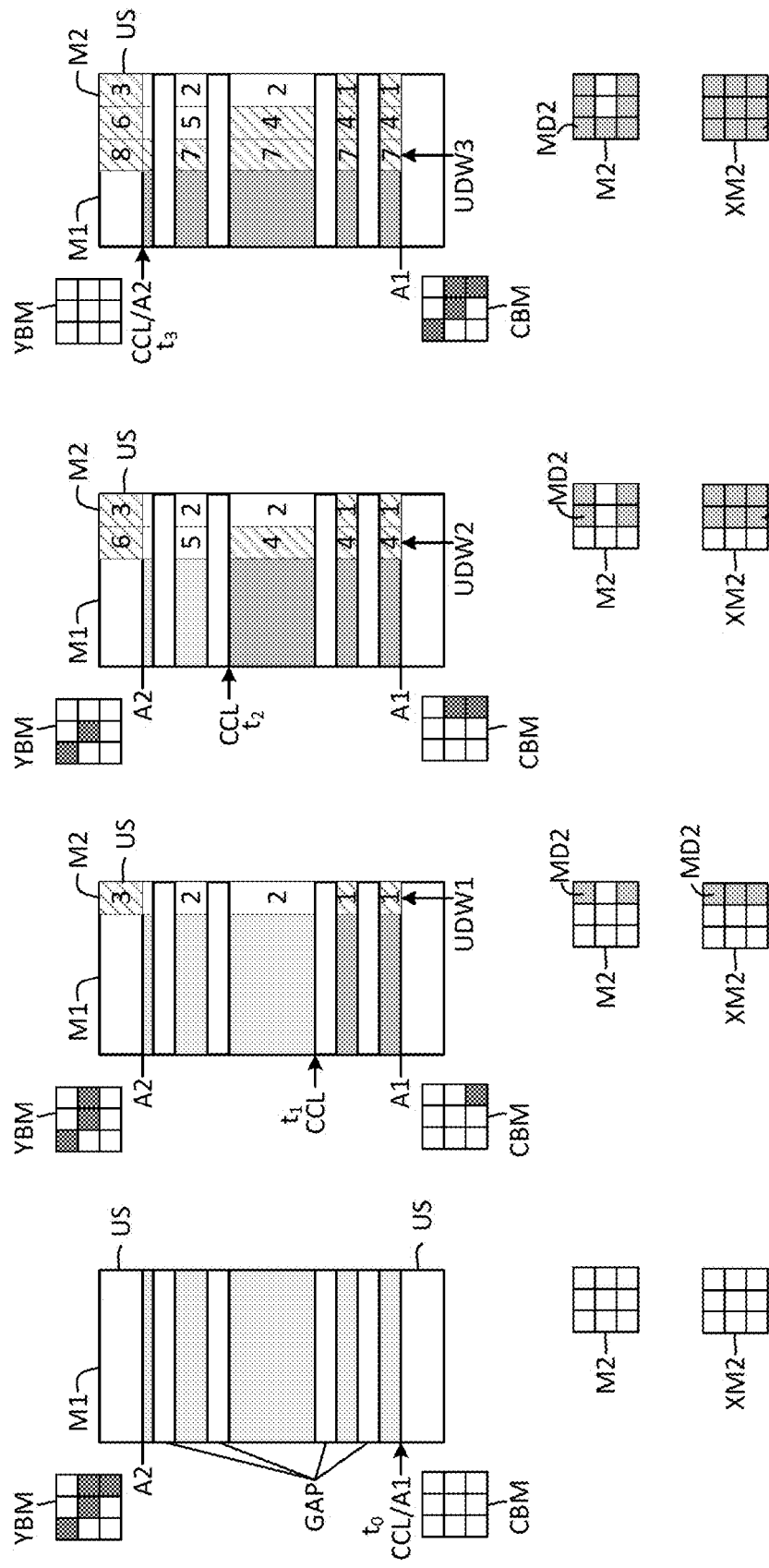
FIG. 7A, FIG. 7B, FIG. 7C, and FIG. 7D (collectively, FIG. 7) are bitmap vision diagrams depicting a method for tracking a progress of data copying for a live migration using the planned but yet to be copied bitmap and the planned and copied bitmap associated with the distributed storage locations of FIG. 6 and a selective generation of second status identifiers in a second data structure, according to some embodiments of the present disclosure.

Referring to FIG. 7, distributed user data writes UDW occurring during or after the transferring of a first data structure M1 may be tracked by the live migration controller 210b by selectively generating second status identifier bits indicating a location of a source data to be copied MD2 in a second data structure M2. For example, the second data structure M2, having the selectively generating method applied, may result in fewer dirty bits (as shown below each of FIG. 7B, FIG. 7C, and FIG. 7D) than an otherwise similar second data structure XM2, not having the selectively generating method applied.

Referring to FIG. 7A, at a zeroth time $t_0$, an LMCP process based on the first data structure M1 indicating distributed storage locations may have not yet begun, such that all of the distributed storage locations are indicated within the planned but yet to be copied bitmap YBM.

Referring to FIG. 7B, at a first time $t_1$, the LMCP process based on the first data structure M1 indicating distributed storage locations may be in progress with the data associated with some of the distributed storage locations having been copied. A first user data write UDW1 may occur at the first time $t_1$, such that a first section of the first user data write UDW1 may occur at distributed storage locations corresponding to the planned and copied bitmap CBM, a second section of the first user data write UDW1 may occur at distributed storage locations corresponding to the planned but yet to be copied bitmap YBM, and a third section of the first user data write UDW1 may occur at distributed storage locations corresponding to the unmapped section US. Accordingly, second status identifier bits indicating a location of a source data to be copied MD2 may be selectively generated in the second data structure M2, such that the second section of the first user data write UDW1 may not be tracked in the second data structure M2.

Referring to FIG. 7C, at a second time $t_2$, the LMCP process based on the first data structure M1 indicating distributed storage locations may be in progress with the data associated with more of the distributed storage locations having been copied. A second user data write UDW2 may occur at the second time $t_2$, such that a fourth section of the second user data write UDW2 may occur at distributed storage locations corresponding to the planned and copied bitmap CBM, a fifth section of the second user data write UDW2 may occur at distributed storage locations corresponding to the planned but yet to be copied bitmap YBM, and a sixth section of the second user data write UDW2 may occur at distributed storage locations corresponding to the unmapped section US. Accordingly, second status identifier bits indicating a location of a source data to be copied MD2 may be selectively generated in the second data structure M2, such that the fifth section of the second user data write UDW2 may not be tracked in the second data structure M2.

Referring to FIG. 7D, at a third time $t_3$, the LMCP process based on the first data structure M1 indicating distributed storage locations may be completed, with the data associated with all of the distributed storage locations having been copied. A third user data write UDW3 may occur at the third time $t_3$, such that a seventh section of the third user data write UDW3 may occur at distributed storage locations corresponding to the planned and copied bitmap CBM and an eighth section of the third user data write UDW3 may occur at distributed storage locations corresponding to the unmapped section US. Accordingly, second status identifier bits indicating a location of a source data to be copied MD2 may be selectively generated in the second data structure M2, such that all of sections of the third user data write UDW3 may be tracked in the second data structure M2.

In the case of selective clearing methods (discussed below with reference to FIGS. 10 and 13), the second data structure M2 and the otherwise similar second data structure XM2 would appear the same initially (e.g., at a first time $t_1$) but the second data structure M2 would have second status identifier bits indicating a location of a source data to be copied MD2 selectively cleared later (e.g., after the first time $t_1$).

FIG. 8A, FIG. 8B, and FIG. 8C (collectively, FIG. 8) are bitmap vision diagrams depicting a method for tracking a progress of data copying for a live migration in a subsequent iteration of data copying using a planned but yet to be copied bitmap and a planned and copied bitmap, corresponding to the second data structure of FIG. 7, and a selective generation of third status identifiers in a third data structure, according to some embodiments of the present disclosure.

Referring to FIG. 8, the same selectively generating method may be applied to subsequent LMCP iterations. For example, as shown in FIG. 2, a second data structure M2 may actively track user data writes UDW (in a second data structure M2) to the source storage 200 occurring during or after a first data structure M1 is transferred to the live migration server 100b for a first LMCP process. After the first LMCP process, the second data structure M2 may be transferred to the live migration server 100b, as shown in FIG. 3, for a second LMCP iteration. The live migration controller 210b may track user data writes UDW (in a third data structure M3) occurring during or after the second data structure M2 is transferred to the live migration server 100b for a second LMCP process. Accordingly, as shown in FIG. 8B and FIG. 8C, the third data structure M3, having the selectively generating method applied, may result in fewer dirty bits than an otherwise similar third data structure XM3, not having the selectively generating method applied.

For example, and referring to FIG. 8A, at a zeroth time $t_0$, an LMCP process based on the second data structure M2 indicating storage locations to be copied (e.g., distributed storage locations) may have not yet begun, such that all of the storage locations are indicated within the planned but yet to be copied bitmap YBM. Furthermore, because the second data structure M2 may have been generated during a previous LMCP iteration based on selective generation (or selective clearing) techniques, FIG. 8A indicates storage locations of the second data structure that are within the planned to copy section P and storage locations of the second data structure that are outside of the planned to copy section O.

Referring to FIG. 8B, at a first time $t_1$, the LMCP process based on the second data structure M2 may be in progress with the data associated with some of the storage locations having been copied. A first user data write UDW1 may occur at the first time $t_1$, such that a first section of the first user data write UDW1 may occur at some storage locations corresponding to the planned and copied bitmap CBM and some storage locations of the second data structure that are outside of the planned to copy section O, a second section of the first user data write UDW1 may occur only at storage locations of the second data structure that are outside of the planned to copy section O, and a third section of the first user data write UDW1 may occur at storage locations corresponding only to the planned but yet to be copied bitmap YBM. Accordingly, third status identifier bits indicating a location of a source data to be copied MD3 may be selectively generated in the third data structure M3, such that the third section of the first user data write UDW1 may not be tracked in the third data structure M3 (and the first and second sections of the first user data write UDW1 may be tracked in the third data structure M3).

Referring to FIG. 8C, at a second time $t_2$, the LMCP process based on the second data structure M2 may be completed, with the data associated with all of the storage locations having been copied. A second user data write UDW2 may occur at the second time $t_2$, such that a fourth section, a fifth section, and a sixth section of the second user data write UDW2 may all occur at storage locations corresponding to either the planned and copied bitmap CBM or at storage locations of the second data structure that are outside of the planned to copy section O. Accordingly, third status identifier bits indicating a location of a source data to be copied MD3 may be selectively generated in the third data structure M3, such that all of the sections of the second user data write UDW2 may be tracked in the third data structure M3.

Figure 9A:
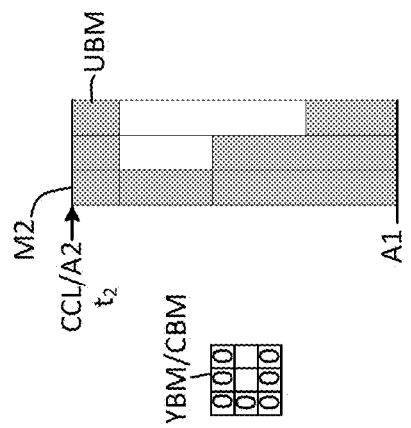
FIG. 9A, FIGS. 9B, and 9C (collectively, FIG. 9) are bitmap vision diagrams depicting a method for tracking a progress of data copying for a live migration using the planned but yet to be copied bitmap of FIG. 8 and tracking a planned and copied section by inverting a bit state used to track the planned but yet to be copied section, according to some embodiments of the present disclosure.
Figure 9B:
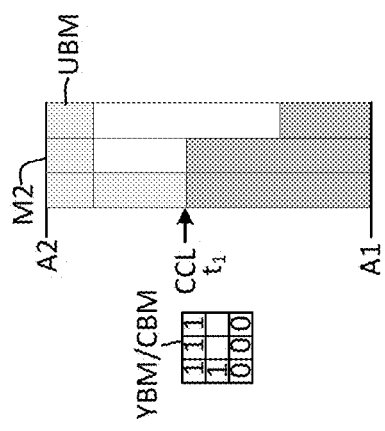
Figure 9C:
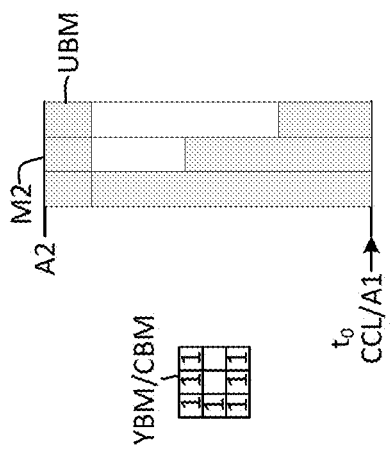

FIG. 9A, FIGS. 9B, and 9C (collectively, FIG. 9) are bitmap vision diagrams depicting a method for tracking a progress of data copying for a live migration using the planned but yet to be copied bitmap of FIG. 8 and tracking a planned and copied section by inverting a bit state used to track the planned but yet to be copied section, according to some embodiments of the present disclosure.

Referring to FIG. 9, a single bitmap, a planned and yet to be copied bitmap/planned and copied bitmap YBM/CBM ("YBM/CMB bitmap"), may be created and used by the live migration controller 210b to track both sections. For example, the live migration controller 210b may identify locations in the bitmap corresponding to the planned but yet to be copied section YS of the source storage 200 with a first bit state (e.g., a "1"). Referring to FIG. 9A, all of the status identifiers associated with the YBM/CMB bitmap may be associated with a planned but yet to be copied section of the source storage 200 at a zeroth time $t_0$. Referring to FIG. 9B and FIG. 9C, the bitmap locations corresponding to the planned and copied bitmap may be identified by inverting the first bit state to a second bit state (e.g., a "0") after the source data associated with the bitmap locations has been copied by the live migration server 100b. Accordingly, a memory size of the bitmaps used to track the current copy location may be reduced. For example, a single planned and yet to be copied bitmap YBM may be used instead of using three bitmaps (e.g., a planned and copied bitmap CBM, a planned but yet to be copied bitmap YBM, and an unmapped bitmap).

Figure 10:
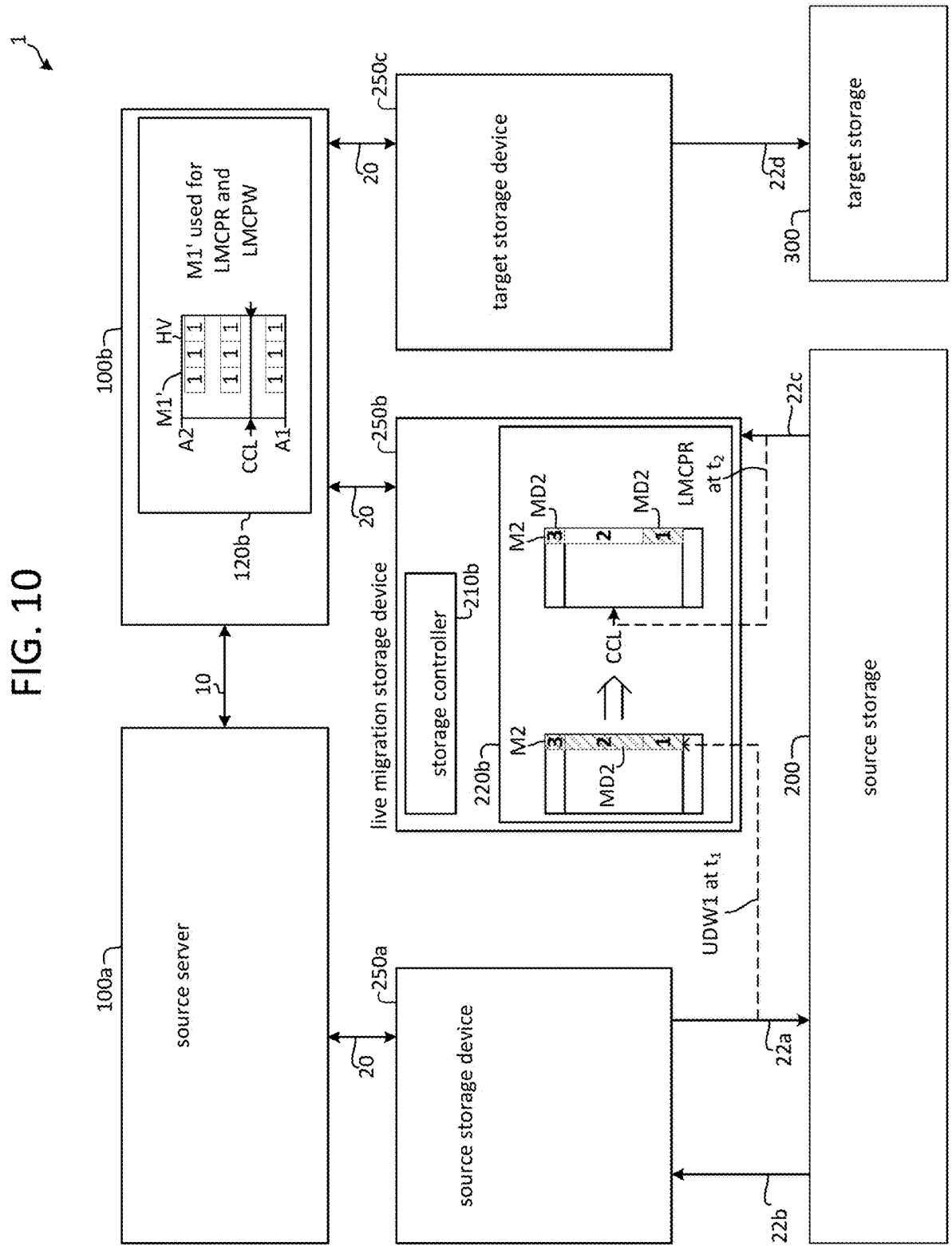
FIG. 10 is a system diagram including a bitmap vision diagram depicting a system and method for tracking a progress of data copying for a live migration process using a second data structure and a selective clearing of second status identifiers in the second data structure, according to some embodiments of the present disclosure.

FIG. 10 is a system diagram including a bitmap vision diagram depicting a system and method for tracking a progress of data copying for a live migration process using a second data structure and a selective clearing of second status identifiers in the second data structure, according to some embodiments of the present disclosure.

Referring to FIG. 10, in some embodiments, the live migration controller 210b may reduce redundant copying by the live migration server 100b by selectively clearing (e.g., resetting or changing a dirty bit from a "1" to a "0") second status identifier bits indicating a location of a source data to be copied MD2 from a second data structure M2 (without referring to a planned but yet to be copied section YS or a planned and copied section CS). For example, the live migration controller 210b may monitor (e.g., in parallel) user data writes UDW and a current copying locations CCL. For example, the live migration controller 210b may monitor a first user data write UDW1 at a first time $t_1$ and generate the second status identifier bits indicating a location of a source data to be copied MD2 (e.g., set "1") in the second data structure M2 corresponding to all locations of the first data write UDW1 (e.g., sections 1, 2, and 3). Thus, at the first time $t_1$, all the bitmap locations corresponding to the locations of the first user data write UDW1 may have second status identifier bits indicating a location of a source data to be copied MD2 (e.g., dirty bits), even at section 2. Based on a second status identifier bit indicating a location of a source data to be copied MD2 (e.g., a dirty bit or "1") being identified at a second time $t_2$ (a later time than the first time $t_1$) as corresponding with the current copying location CCL, the live migration controller 210b may clear the second status identifier bit indicating a location of a source data to be copied MD2 from the second data structure M2 (e.g., may clear a "1" bit to a "0" bit) associated with the current copying location CCL (e.g., the dirty bits at section 2) because the data associated with the dirty bits (1s) has been copied from the source storage 200 and, thus, need not be copied at a later LMCP iteration. In some embodiments, the live migration controller 210b may clear (e.g., automatically clear) entries in the second data structure M2 corresponding to the current copying location CCL (e.g., without determining whether the corresponding entry is set to a "1" bit or a "0" bit).

In some embodiments, using the selective clearing method, the system 1 may not incorporate a first data structure M1 (or alternate data structure) to track the current copying location CCL/planned and copied section CS/planned but yet to be copied section YS, or to track the current copying location CCL/planned and copied bitmap CBM/planned but yet to be copied bitmap YBM. For example, the user data writes UDW may be tracked using only a second data structure M2 and a short term of time of the first data structure M1 (e.g., during a transferring of the first data structure M1 to the live migration server 100b). This may result in a more efficient memory usage because the first data structure M1 may be recycled in the live migration controller memory 220b after (e.g., right after) it has been transferred to live migration server 100b. According to such selective clearing embodiments, during most of the live migration operation time, except when transferring the second data structure M2 (or a subsequent iteration of a dirty bitmap, e.g., a third data structure M3), only a dirty bitmap tracking may be performed.

Thus, selective clearing methods may provide several improvements and advantages over other methods. For example, in some embodiments, selective generation methods may use one or three copies of a subdivided first data structure M1 bitmap memory. In some embodiments, selective generation methods may read a current planned but yet to be copied section YS/planned and yet to be copied bitmap YBM status, clear the status to 0, and write a "1" bit to the planned and copied section CS/planned and copied bitmap CBM. Contrastingly, in some embodiments, selective clearing methods may not use a first data structure M1. As a result, less memory may be used for most of the operation time. Furthermore, in some embodiments, selective clearing may not perform an extra read and write to the planned and copied section CS/planned and copied bitmap CBM and a planned but yet to be copied YS/planned but yet to be copied bitmap YBM database.

FIG. 11 is a simplified summary flowchart depicting example operations of methods for tracking a progress of data copying for a live migration process using aspects of methods described above, with reference to FIGS. 1-10, according to some embodiments of the present disclosure.

Referring to FIG. 11, a method 1100 for tracking a progress of data copying for a live migration may include: receiving a request, from a migration server, to transfer data from a source storage to a target storage (operation 1101); transferring a first data structure from a storage controller to the live migration server, the first data structure including a first status identifier (operation 1102); clearing all locations in a second data structure (operation 1103); selectively generating a second status identifier (e.g., set "1" to a location) in the second data structure, based on a current copying location of the live migration server (operation 1104A); or non-selectively generating a second status identifier in the second data structure, and selectively clearing the second status identifier (e.g., clear a location to "0") from the second data structure, based on a current copying location of the live migration server (operation 1104B); and transferring the second data structure to the live migration server (operation 1105).

FIG. 12 is a flowchart depicting example operations of selective generation methods for tracking a progress of data copying for a live migration process, according to some embodiments of the present disclosure.

Referring to FIG. 12, a method 1200 for tracking a progress of data copying for a live migration may include: sending, by a live migration ("LM") server a request to a live migration controller (operation 1201); generating, by the live migration controller, a first data structure M1 (e.g., a bitmap of the mapped pages ("BMP")) (operation 1202); initializing a second data structure M2 (e.g., an initial or subsequent BDP) and setting (e.g., clearing) all of the status identifier bits to 0's (operation 1203); determining whether a user write request (e.g., a normal user write request) has issued from a source storage device (operation 1204) (note: operations on the left side of the flowchart may be associated with the second data structure M2, while operations on the right side of the flowchart may be associated with the first data structure M1; the operations on the left side and the right side of the flowchart may occur substantially in parallel); generating, by a source storage controller, a write command to the source storage (operation 1205); writing a user data write UDW to the source storage (operation 1206); snooping (e.g., monitoring), by live migration controller, user data writes UDW to storage locations (e.g., LBAs) of the source storage (e.g., by extracting LBA addresses associated with the user data writes UDW) (operation 1207); determining, by the live migration controller, whether to generate dirty bits in the second data structure M2, based on determining whether a user data write UDW occurred in a planned but yet to be copied section YS/YBM (e.g., by determining whether a status identifier bit of the planned but yet to be copied bitmap YS/YBM, corresponding to an LBA address of the user data write UDW, is set to "1," thereby indicating that the LBA address is within the planned but yet to be copied section YS/YBM) (operation 1208) (see also related operation 1218); generating a dirty bit in the second data structure M2 based on determining that the user data write UDW has occurred in the planned but yet to be copied section YS/YBM (operation 1209A); disabling (or preventing or foregoing) a generation of a dirty bit in the second data structure M2 based on determining that the user data write UDW has not occurred in the planned but yet to be copied section YS/YBM (operation 1209B); determining whether the data copying, based on a host version of the first data structure M1' in the live migration server 100b (e.g., the BMP), has finished (and looping back to operation 1204 based on determining that the data copying has not finished) (operation 1210); initializing, by the live migration controller, a third data structure M3 (e.g., by clearing all status identifier bits of the third data structure M3 to "0") (operation 1211); transferring the second data structure M2 to the live migration server (operation 1212); transferring the first data structure M1 (e.g., the BMP) to the live migration server (operation 1213); initializing, by the live migration controller, the planned and copied section CS/planned and copied bitmap CBM (e.g., by setting all status identifier bits to 0's), and the planned but yet to be copied section YS/planned but yet to be copied bitmap YBM (e.g., by setting all status identifier bits to correspond to the status identifier bits (e.g., 1's) of the first data structure M1) (operation 1214); determining whether an LM Copy Read has occurred (and looping back to operation 1215 based on determining that no LM Copy Read has occurred) (operation 1215); snooping (e.g., monitoring) the LMCPR read LBA address in response to a determination that an LM Copy Read has occurred (e.g., by extracting LBA addresses associated with the LMCPR read) (operation 1216); reading, by the live migration server, from the source storage (based on determining that an LM Copy Read has occurred) (operation 1217); clearing a status identifier bit entry (e.g., a planned but yet to be copied section status identifier bit indicating a location of a source data to be copied YS.MD1, or YS/YBM.MD1) in the planned but yet to be copied section YS/planned but yet to be copied bitmap YBM (e.g., based on the snooped LBA address) (operation 1218) (note: dashed line 1218x indicates that status identifier bits set to 1 at operation 1208 may be cleared at operation 1218 based on the corresponding data being copied); adding (e.g., setting) a status identifier bit entry (e.g., a planned and copied section status identifier bit indicating a location of a source data that has been copied CS.MD1, or CS/CBM.MD1) in the planned and copied section CS/planned and copied bitmap CBM (e.g., based on the snooped LBA address) (operation 1219); determining whether the data copying of the first data structure M1 has finished (operation 1220) (note: dashed line 1220x indicates that both of operations 1210 and 1220 may include checking the same BMP COPY END result—e.g., in the same database); and stopping the LMCPR snooping operations of the current iteration based on determining that the data copying of the first data structure M1, by the live migration server, has finished (operation 1221).

FIG. 13 is a flowchart depicting example operations of selective clearing methods for tracking a progress of data copying for a live migration process, according to some embodiments of the present disclosure.

Referring to FIG. 13, a method 1300 for tracking a progress of data copying for a live migration may include: sending, by a live migration ("LM") server a request to a live migration controller (operation 1301); generating, by the live migration controller, a first data structure M1 (e.g., a bitmap of the mapped pages ("BMP")) (operation 1302); initializing (e.g., generating or creating) a second data structure M2 (e.g., an initial or subsequent BDP) and setting (e.g., clearing) all of the status identifier bits to 0's (operation 1303); determining whether a user write request (e.g., a normal user write request) has issued (e.g., occurred) from a source storage device (and looping back to operation 1304 based on determining that no user write request has issued) (operation 1304) (note: operations on the left side of the flowchart may be associated with the second data structure M2, while operations on the right side of the flowchart may be associated with the first data structure M1; the operations on the left side and the right side of the flowchart may occur substantially in parallel); generating, by a source storage controller, a write command to the source storage (operation 1305); writing a user data write UDW to the source storage (operation 1306); snooping (e.g., monitoring), by live migration controller, user data writes UDW to storage locations (e.g., LBAs) of the source storage (e.g., by extracting LBA addresses associated with the user data writes UDW) (operation 1307); generating dirty bits in the second data structure M2 (operation 1308) (see also related operation 1317); determining whether the data copying, based on the first data structure M1 (e.g., the BMP), has finished (and looping back to operation 1304 based on determining that the data copying, based on the first data structure M1, has not finished) (operation 1309); initializing, by the live migration controller, a third data structure M3 based on determining that the data copying, based on the first data structure M1, has finished (e.g., by setting all status identifier bits of the third data structure M3 to "0") (operation 1310); transferring the second data structure M2 to the live migration server (operation 1311); transferring the first data structure M1 (e.g., the BMP) to the live migration server (operation 1312); determining whether an LM Copy Read has occurred (and looping back to operation 1313 based on determining that no LM Copy Read has occurred) (operation 1313); snooping (e.g., monitoring) the LMCPR read LBA address based on determining that an LM Copy Read has occurred (e.g., by extracting LBA addresses associated with the LMCPR read) (operation 1314); reading, by the live migration server, from the source storage (operation 1315); clearing (e.g., to 0) the status identifier bit (e.g., the dirty bit) entry in the second data structure M2 (e.g., based on the snooped LBA) (operation 1316) (note: dashed line 1316x indicates dirty bits generated in the second data structure M2 at operation 1308 may be selectively cleared at operation 1316); determining whether the data copying of the first data structure M1 has finished (operation 1317) (note: dashed line 1317x indicates that both of operations 1309 and 1317 may include checking the same BMP COPY END result—e.g., in the same database); and stopping the LMCPR snooping operations of the current iteration based on determining that the data copying of the first data structure M1, by the live migration server, has finished (operation 1318).

Accordingly, embodiments of the present disclosure provide improvements and advantages for tracking a progress of data copying during a live migration process. By selectively generating or selectively clearing dirty bits in a dirty bitmap, a redundant copying of source data may be reduced and computing resources (e.g., memory, bandwidth, power, and host or storage device processing) may be used more efficiently.

While embodiments of the present disclosure have been particularly shown and described with reference to the embodiments described herein, it will be understood by those of ordinary skill in the art that various changes in form and details may be made therein without departing from the spirit and scope of the present invention as set forth in the following claims and their equivalents.

What is claimed is:

1. A method for tracking a progress of data copying for a live migration, the method comprising:
transferring, by a storage controller, a first data structure to a live migration server, the first data structure comprising a first status identifier indicating a location of a source data to be copied from a source storage to a target storage; and
selectively updating, by the storage controller, a second data structure, based on a first current copying location of the live migration server, the second data structure indicating a location of a first user data write to the source storage, wherein the first current copying location is tracked based on status identifier bits of the first data structure.

2. The method of claim 1, wherein the selectively updating the second data structure based on the first current copying location comprises selectively clearing, by the storage controller, a second status identifier from the second data structure based on the first current copying location by:
generating the second status identifier in the second data structure based on the first user data write; and
clearing, by the storage controller, the second status identifier from the second data structure, based on the second status identifier being associated with the first current copying location of the live migration server.

3. The method of claim 1, further comprising:
monitoring, by the storage controller, the first current copying location, the first current copying location corresponding to a copying of the source data based on the first data structure; and
monitoring, by the storage controller, the first user data write,
wherein the selectively updating the second data structure based on the first current copying location comprises selectively generating a second status identifier in the second data structure based on the first current copying location by:
tracking, by the storage controller, a planned but yet to be copied section of the source storage and a planned and copied section of the source storage, based on the first current copying location; and
generating the second status identifier in the second data structure based on the planned but yet to be copied section.

4. The method of claim 3, wherein the tracking, based on the first current copying location, the planned but yet to be copied section and the planned and copied section comprises tracking a current copy index corresponding to:
a start address of a continuous index; and
an end address of the continuous index,
the continuous index being associated with a planned to copy section comprising contiguous storage locations.

5. The method of claim 3, wherein the tracking, based on the first current copying location, the planned but yet to be copied section and the planned and copied section comprises tracking a planned but yet to be copied bitmap and a planned and copied bitmap, the planned but yet to be copied bitmap and the planned and copied bitmap, both, being associated with a planned to copy section, the planned to copy section comprising one or more distributed storage locations.

6. The method of claim 3, wherein the tracking, based on the first current copying location, the planned but yet to be copied section and the planned and copied section comprises:
tracking a planned but yet to be copied bitmap associated with a planned to copy section comprising:
both the planned but yet to be copied section and the planned and copied section; and
one or more distributed storage locations; and
tracking, using the planned but yet to be copied bitmap, the planned and copied section by inverting a bit state used to track the planned but yet to be copied section.

7. The method of claim 1, further comprising transferring the second data structure to the live migration server.

8. The method of claim 7, further comprising:
monitoring, by the storage controller, a second current copying location of the live migration server, the second current copying location corresponding to a copying of the source data based on the second data structure;
monitoring, by the storage controller, a second user data write to the source storage, the second user data write occurring during or after the transferring of the second data structure; and
selectively updating, by the storage controller, a third data structure, based on the second current copying location of the live migration server, the third data structure indicating a location of the second user data write to the source storage,
wherein the first current copying location corresponds to the data copying, by the live migration server, from the source storage to the target storage.

9. A storage device for tracking a progress of data copying for a live migration, the storage device being configured to:
transfer a first data structure to a live migration server, the first data structure comprising a first status identifier indicating a location of a source data to be copied from a source storage to a target storage; and
selectively update a second data structure, based on a first current copying location of the live migration server, the second data structure indicating a location of a first user data write to the source storage, wherein the first current copying location is tracked based on status identifier bits of the first data structure.

10. The storage device of claim 9, wherein the selectively updating the second data structure based on the first current copying location comprises selectively clearing a second status identifier from the second data structure based on the first current copying location by:
generating the second status identifier in the second data structure based on the first user data write; and
clearing the second status identifier from the second data structure, based on the second status identifier being associated with the first current copying location of the live migration server.

11. The storage device of claim 9, wherein the storage device is configured to:
monitor the first current copying location, the first current copying location corresponding to a copying of the source data based on the first data structure; and
monitor the first user data write,
wherein the selectively updating the second data structure based on the first current copying location comprises selectively generating a second status identifier in the second data structure based on the first current copying location by:
tracking a planned but yet to be copied section of the source storage and a planned and copied section of the source storage, based on the first current copying location; and
generating the second status identifier in the second data structure based on the planned but yet to be copied section.

12. The storage device of claim 11, wherein the tracking, based on the first current copying location, the planned but yet to be copied section and the planned and copied section comprises tracking a current copy index corresponding to:
a start address of a continuous index; and
an end address of the continuous index,
the continuous index being associated with a planned to copy section comprising contiguous storage locations.

13. The storage device of claim 11, wherein the tracking, based on the first current copying location, the planned but yet to be copied section and the planned and copied section comprises tracking a planned but yet to be copied bitmap and a planned and copied bitmap, the planned but yet to be copied bitmap and the planned and copied bitmap, both, being associated with a planned to copy section, the planned to copy section comprising one or more distributed storage locations.

14. The storage device of claim 11, wherein the tracking, based on the first current copying location, the planned but yet to be copied section and the planned and copied section comprises:
tracking a planned but yet to be copied bitmap associated with a planned to copy section comprising:
both the planned but yet to be copied section and the planned and copied section; and
one or more distributed storage locations; and tracking, using the planned but yet to be copied bitmap, the planned and copied section by inverting a bit state used to track the planned but yet to be copied section.

15. The storage device of claim 9, wherein the storage device is configured to:
- transfer the second data structure to the live migration server;
- monitor a second current copying location of the live migration server, the second current copying location corresponding to a copying of the source data based on the second data structure;
- monitor a second user data write to the source storage, the second user data write occurring during or after the transferring of the second data structure; and
- selectively update a third data structure, based on the second current copying location of the live migration server, the third data structure indicating a location of the second user data write to the source storage,
- wherein the first current copying location corresponds to the data copying, by the live migration server, from the source storage to the target storage.

16. A system for tracking a progress of data copying for a live migration, the system comprising:
- a live migration server; and
- a storage device, wherein the storage device is configured to:
  - transfer a first data structure to the live migration server, the first data structure comprising a first status identifier indicating a location of a source data to be copied from a source storage to a target storage; and
  - selectively update a second data structure, based on a first current copying location of the live migration server, the second data structure indicating a location of a first user data write to the source storage, wherein the first current copying location is tracked based on status identifier bits of the first data structure.

17. The system of claim 16, wherein the selectively updating the second data structure based on the first current copying location comprises selectively clearing a second status identifier from the second data structure based on the first current copying location by:
- generating the second status identifier in the second data structure based on the first user data write; and
- clearing the second status identifier from the second data structure, based on the second status identifier being associated with the first current copying location of the live migration server.

18. The system of claim 16, wherein the storage device is configured to:
- monitor the first current copying location, the first current copying location corresponding to a copying of the source data based on the first data structure; and
- monitor the first user data write,
- wherein the selectively updating the second data structure based on the first current copying location comprises selectively generating a second status identifier in the second data structure based on the first current copying location by:
  - tracking a planned but yet to be copied section of the source storage and a planned and copied section of the source storage, based on the first current copying location; and
  - generating the second status identifier in the second data structure based on the planned but yet to be copied section.

19. The system of claim 18, wherein the tracking, based on the first current copying location, the planned but yet to be copied section and the planned and copied section comprises tracking a current copy index corresponding to:
- a start address of a continuous index; and
- an end address of the continuous index,
- the continuous index being associated with a planned to copy section comprising contiguous storage locations.

20. The system of claim 18, wherein the tracking, based on the first current copying location, the planned but yet to be copied section and the planned and copied section comprises:
- tracking a planned but yet to be copied bitmap associated with a planned to copy section comprising:
  - both the planned but yet to be copied section and the planned and copied section; and
  - one or more distributed storage locations; and
- tracking, using the planned but yet to be copied bitmap, the planned and copied section by inverting a bit state used to track the planned but yet to be copied section, and
- wherein the first current copying location corresponds to the data copying, by the live migration server, from the source storage to the target storage.

* * * * *